(12) United States Patent
Awad et al.

(10) Patent No.: US 9,596,667 B2
(45) Date of Patent: Mar. 14, 2017

(54) COMMUNICATION SYSTEM

(71) Applicants: Yassin Aden Awad, Tokyo (JP); Kay Seo, Tokyo (JP)

(72) Inventors: Yassin Aden Awad, Tokyo (JP); Kay Seo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 115 days.

(21) Appl. No.: 14/356,567

(22) PCT Filed: Oct. 29, 2012

(86) PCT No.: PCT/JP2012/078551
§ 371 (c)(1),
(2) Date: May 6, 2014

(87) PCT Pub. No.: WO2013/069579
PCT Pub. Date: May 16, 2013

(65) Prior Publication Data
US 2014/0314072 A1    Oct. 23, 2014

(30) Foreign Application Priority Data

Nov. 7, 2011 (GB) .................................. 1119207.7

(51) Int. Cl.
*H04W 56/00* (2009.01)
*H04L 5/00* (2006.01)

(52) U.S. Cl.
CPC ......... *H04W 56/0015* (2013.01); *H04L 5/001* (2013.01)

(58) Field of Classification Search
USPC ............... 370/252–329, 331–336, 350–509; 455/423–456
See application file for complete search history.

(56) References Cited

U.S. PATENT DOCUMENTS

| | | | |
|---|---|---|---|
| 6,894,995 B2 * | 5/2005 | Chitrapu | H04B 1/7083 370/335 |
| 8,200,241 B2 * | 6/2012 | Du | H04W 74/08 455/456.1 |

(Continued)

FOREIGN PATENT DOCUMENTS

| EP | 2373094 A1 | 10/2011 |
|---|---|---|
| WO | WO 2005/053198 A2 | 6/2005 |
| WO | WO 2010/099736 A1 | 9/2010 |

OTHER PUBLICATIONS

3GPP TS 36.211 V10.2.0, 3$^{rd}$ Generation Partnership Project; Technical Specification Group Radio Access Network; Evolved Universal Terrestrial Radio Access (E-UTRA); Physical Channels and Modulation (Jun. 2011).

(Continued)

*Primary Examiner* — Man Phan
(74) *Attorney, Agent, or Firm* — McGinn IP Law Group, PLLC

(57) ABSTRACT

A communication system is disclosed in which each base station is configured to provide synchronizations signals in each radio frame of both a primary (backwards compatible) component carrier and a secondary (extension) component carrier. The location of the synchronization signals in the radio frame of the primary (backwards compatible) component carrier are fixed whilst the location of the synchronization signals in the radio frame of the secondary (extension) component carrier are configurable.

20 Claims, 11 Drawing Sheets

(56) References Cited

U.S. PATENT DOCUMENTS

| | | | | |
|---|---|---|---|---|
| 8,472,954 | B2* | 6/2013 | Nogami | H04J 11/0069 370/350 |
| 8,705,501 | B2* | 4/2014 | Gupta | H04W 24/02 370/328 |
| 8,712,430 | B2* | 4/2014 | Tang | H04W 24/02 455/115.1 |
| 9,119,132 | B2* | 8/2015 | Luo | H04W 48/12 |
| 2010/0220651 | A1* | 9/2010 | Chen | H04L 5/0007 370/328 |
| 2011/0103243 | A1* | 5/2011 | Larsson | H04L 5/001 370/252 |
| 2013/0089065 | A1* | 4/2013 | Koorapaty | H04W 56/001 370/330 |
| 2014/0004850 | A1* | 1/2014 | Kwon | H04W 68/02 455/423 |
| 2014/0247808 | A1* | 9/2014 | Zhang | H04L 5/003 370/331 |

OTHER PUBLICATIONS

RP-111115, "LTE Carrier Aggregation Enhancements", RAN#53, Sep. 13-16, 2011, Fukuoka, Japan.

R1-111323, "Remaining details for CA based HetNet in Rel-10," Ericsson and ST-Ericsson, May 9-13, 2011, Barcelona, Spain.

R1-112428, "On need of additional carrier type in Rel-11 CA", NTTDOCOMO, Aug. 22-26, 2011, Athens, Greece.

R1-112926, "On time and frequency synchronization on additional carrier types", Ericsson, ST-Ericsson, Oct. 10-14, 2011, Zhuhai, China.

R1-113168, "Initial Discussions on New Carrier Types for LTE Rel-11", Renesas Mobile Europe Ltd., Oct. 10-14, 2011, Zhuhai, China.

R1-113186, "Additional Carrier Type for Rel-11", LG Electronics, Oct. 10-14, 2011, Zhuhai, China.

R1-112137, "DL Control channel enhancements with carrier aggregation solutions", NEC Group, Aug. 22-26, 2011, Athens, Greece.

Huawei et al, "Additional carrier types a motivations and issues", 3GPP Draft; R1-112893, Oct. 10-14, 2011, Zhuhai, China.

NEC Group, "Additional Carrier Types: Extension carrier", 3GPP Draft; R1-113226, Oct. 10-14, 2011, Zhuhai, China.

International Search Report in PCT/JP2012/078551 dated Mar. 27, 2013 (English Translation Thereof).

Japanese Office Action dated Jan. 20, 2016.

"System Performance Gains with Rel-10 ICIC and Het-Net Enhancements for Rel-11" *Texas Instruments* Athens, Greece, Aug. 22-26, 2011. 3GPP TSG RAN WG1 Meeting #66, R1-112154.

"Considerations on measurement mismatch problem" *LG Electronics* Dublin, Ireland, Jan. 17-21, 2011, 3GPP TSG RAN WG1 Meeting #63bis, R1-110545.

Japanese Office Action dated Aug. 19, 2015.

"Performance Evaluations of Heterogeneous Networks", NTT DOCOMO, 3GPP TSG RAN WG1 Meeting #60, San Francisco, USA, Feb. 22-26, 2010, R1-101226.

"Considerations on CSI-RS configuration signaling", ZTE, 3GPP TSG RAN WG1 Meeting #62, Madrid, Spain, Aug. 23-27, 2010, R1-104554.

"Remaining Details for CA-based HetNets", Ericsson, ST-Ericsson, 3GPP TSG RAN WG1 Meeting #62bis, Xian, China, Oct. 11-15, 2010, R1-105321.

"Views on eICIC Schemes for Rel-10", NTT DOCOMO, 3GPP TSG RAN WG1 Meeting #62bis, Xian, China, Oct. 11-15, 2010, R1-105724.

"EICIC Macro-Femto: Time-domain muting and ABS", InterDigital Communications, LLC, 3GPP TSG-RAN WG1 #63, Jacksonville, FL, USA, Nov. 15-19, 2010, R1-105951.

"PSS/SSS Detection in Heterogeneous Networks", Research in Motion UK Limited, 3GPP TSG RAN WG1 Meeting #66, Athens, Greece, Aug. 22-26, 2011, R1-112369.

"On transmitter based solutions for eICIC", Qualcomm Incorporated, 3GPP TSG-RAN WG1 #66bis, Zhuhai, China, Oct. 10-14, 2011, R1-113384.

* cited by examiner

COMMUNICATION SYSTEM

TECHNICAL FIELD

The present invention relates to mobile communications devices and networks, particularly but not exclusively those operating according to the 3$^{rd}$ Generation Partnership Project (3GPP) standards or equivalents or derivatives thereof. The invention has particular although not exclusive relevance to the Long Term Evolution (LTE) of UTRAN (called Evolved Universal Terrestrial Radio Access Network (E-UTRAN)).

BACKGROUND ART

It has been decided, as part of the 3GPP standardisation process, that downlink operation for system bandwidths beyond 20 MHz will be based on the aggregation of a plurality of component carriers at different frequencies. Such carrier aggregation can be used to support operation in a system both with and without a contiguous spectrum (for example, a non-contiguous system may comprise component carriers at 800 MHz, 2 GHz, and 3.5 GHz). Whilst a legacy mobile device may only be able to communicate using a single, backward compatible, component carrier, a more advanced multi-carrier capable terminal would be able to simultaneously use the multiple component carriers.

Carrier aggregation can be particularly beneficial in a heterogeneous network (HetNet), even when the system bandwidth is contiguous, and does not exceed 20 MHz because multiple carriers enable interference management between different power class cells as well as open access and closed subscriber group (CSG) cells. Long-term resource partitioning can be carried out by exclusively dedicating carriers to a certain power class of cell (Macro/Pico/CSG).

Further, the need for interference management between different cells operating on component carriers of the same frequency in co-incident or overlapping geographic areas has led to the proposal (in Release 11) and development of extension carriers in which as much of the legacy control and pilot signalling (including Common Reference Signalling) as possible are removed. In addition to the benefits in terms of interference management, this also helps to minimise overhead. This means that extension carriers are not generally compatible with Release 10 and earlier mobile communication devices.

More specifically, a multi-carrier capable base station is able to operate at least one of its carriers as an extension carrier, on which a control channel (e.g. a channel carrying resource scheduling information such as the Physical Downlink Control Channel (PDCCH)), a Common Reference Signal (CRS) (sometimes referred to as a Cell-specific Reference Signal), and other information cannot be transmitted. To allow the use of an extension carrier, at least one further component carrier of the component carrier set used by the multi-carrier base station must be a stand-alone carrier that can be used to transmit the scheduling information for the extension carrier.

Accordingly, when a first base station is operating a component carrier as an extension carrier, another base station may operate a component carrier of the same frequency to transmit a control channel, a CRS and other such information more reliably, in the same general geographic area as the first base station, without significant interference because there is no corresponding control channel, CRS and other such information on the extension carrier operated by the first base station.

It is possible that the geographical areas covered by the primary cell and secondary cell may not be coincident—either by design, or because the range of the first and second component carriers is different as a result of radio environment conditions. In some cases the primary cell and secondary cells may be in a different geographical location altogether. Further, as mentioned above, the primary cell and secondary cells may operate in different frequency bands than one another. In such cases, despite the fact the primary and secondary cells are controlled from the same base station, a timing error and carrier frequency drift may, nevertheless, arise between the primary and the secondary cells.

DISCLOSURE OF THE INVENTION

An exemplary embodiment of the invention therefore aims to provide a mobile communication system, a mobile communication device, a communication node and associated methods which overcomes or at least mitigates the above issues.

According to one aspect of the present invention there is provided communication apparatus for communicating with a plurality of mobile communication devices in a cellular communication system using a plurality of radio frames, the communication apparatus comprising: means for operating a communication cell on an associated component carrier; means for configuring the apparatus to communicate a signal comprising at least one of a synchronisation signal and a reference signal at a configured relative location within a radio frame to be transmitted in the communication cell using the component carrier, the configured relative location being a location within the radio frame relative both to a time range spanned by the radio frame and to a frequency range spanned by the radio frame; and means for communicating a signal at the configured relative location within the radio frame; wherein the configuring means is operable to configure the apparatus to communicate the signal at any of a plurality of relative locations within the radio frame.

The operating means may be adapted to operate a plurality of communication cells on respective component carriers. The communicating means may be operable to communicate a first signal within a first radio frame transmitted in a first of the plurality of cells using a first component carrier, the first signal being transmitted at a predetermined relative location within the radio frame relative both to a time range spanned by the first radio frame and to a frequency range spanned by the first radio frame. The configuring means may be operable to configure the apparatus to communicate a second signal at a configured relative location within a second radio frame to be transmitted in a second of the plurality of cells using a second component carrier, the configured relative location being a location within the radio frame relative both to a time range spanned by the second radio frame and to a frequency range spanned by the second radio frame. The communicating means may be further operable to communicate a second signal at the configured relative location within the second radio frame. The first and second signals may be of the same type as one another, each comprising at least one of a synchronisation signal and a reference signal and or another control signal. The configuring means may be operable to configure the apparatus to communicate the second signal at a configured relative location within the second radio frame that may be different to the predetermined relative location within the first radio frame.

Each radio frame may comprise a plurality of subframes spanning a range of different subframe locations in time; and the configuring means may be operable to configure the apparatus to communicate the signal, or the second signal, at any of a plurality of relative locations within the radio frame, which plurality of locations may each comprises a different subframe location within the range of subframe locations.

Each radio frame may comprise a plurality of slots spanning a range of different slot locations in time; and the configuring means may be operable to configure the apparatus to communicate the signal, or the second signal, at any of a plurality of relative locations within the radio frame, which plurality of locations may each comprise a different slot location within the range of slot locations.

Each subframe or slot may comprise a plurality of symbols spanning a range of different symbol locations in time; and the configuring means may be operable to configure the apparatus to communicate the signal, or the second signal, at a predetermined symbol location within each subframe or slot in which the signal, or the second signal may be communicated, which predetermined symbol location may be located within a control region of the subframe or slot.

Each subframe or slot may comprise a plurality of symbols spanning a range of different symbol locations in time; and the configuring means may be operable to configure the apparatus to communicate the signal, or the second signal, at any of a plurality of relative locations within the radio frame, which plurality of locations may each comprise a different symbol location within the range of symbol locations.

Each radio frame may comprise a plurality of subcarriers spanning a range of different subcarrier locations in frequency; and the configuring means may be operable to configure the apparatus to communicate the signal, or the second signal, at any of a plurality of relative locations within the radio frame, which plurality of locations may each comprise a different subrange of subcarrier locations within the range of subcarrier locations.

Each radio frame may comprise a plurality of resource blocks spanning a range of different resource block locations in frequency; and the configuring means may be operable to configure the apparatus to communicate the signal, or the second signal, at any of a plurality of relative locations within the radio frame, which plurality of locations may each comprises a different subrange of resource block locations within the range of resource block locations.

The configuring means may be configured to identify a further relative location within a further radio frame used by a further communication apparatus to communicate a signal of the same type as the signal (or the first and second signals) and to configure the signal (or the second signal) at a configured relative location within an associated radio frame that may be different to the identified further relative location within a further radio frame.

The configuring means may be operable to identify the further relative location within the further radio frame by communicating with the further communication apparatus via an X2 interface.

The configuring means may be operable to identify the further relative location within the further radio frame during an automatic neighbour relation (ANR) procedure.

The apparatus may further comprise means for communicating, to the mobile communication devices, information for identifying the configured relative location to the mobile communication devices.

The information for identifying the configured relative location may comprise a configuration index from which the configured relative location may be derived. The link between possible configuration indexes and possible configured relative locations may be represented by a look-up table in a memory of the apparatus. The look-up table may comprise a link between possible configuration indexes and possible configured relative locations as follows:

| Configuration Index | Subframe numbers used for associated transmission |
| --- | --- |
| 0 | None |
| 1 | 0, 5 |
| 2 | 1, 6 |
| 3 | 2, 7 |
| 4 | 3, 8 |
| 5 | 4, 9 |

The link between possible configuration indexes and possible configured relative locations may be represented by one or more equations in a memory of the apparatus. At least one equation may represent a link between a cell identity (Cell_ID) and a configuration index as follows:

$$\text{configuration index} = (\text{Cell\_ID mod } 5) + 1$$

The information for identifying the configured relative location may comprise an explicit indication of the configured relative location. The information for identifying the configured relative location may comprise a cell identity of the cell in which the signal, or second signal, may be communicated.

The signal (or each of the first and second signals) may comprise a synchronisation signal. The signal (or each of the first and second signals) may comprise a primary or secondary synchronisation signal. The signal (or each of the first and second signals) may comprise a reference signal. The signal (or each of the first and second signals) may comprise a demodulation reference signal (DMRS). The signal (or each of the first and second signals) may comprise a common or cell-specific reference signal (CRS).

The apparatus may comprise a base station.

According to one aspect of the present invention there is provided communication apparatus for communicating with a plurality of mobile communication devices in a cellular communication system using a plurality of radio frames the communication apparatus comprising: means for operating a plurality of communication cells on respective component carriers; means for communicating a first signal within a first radio frame transmitted in a first of the plurality of cells using a first component carrier, the first signal being transmitted at a predetermined relative location within the radio frame relative both to a time range spanned by the first radio frame and to a frequency range spanned by the first radio frame; and means for configuring the apparatus to communicate a second signal at a configured relative location within a second radio frame to be transmitted in a second of the plurality of cells using a second component carrier, the configured relative location being a location within the radio frame relative both to a time range spanned by the second radio frame and to a frequency range spanned by the second radio frame; wherein the communicating means is further operable to communicate a second signal at the configured relative location within the second radio frame; wherein the first and second signals are of the same type as one another, each comprising at least one of a synchronisation signal and a reference signal; and wherein the configuring means is operable to configure the apparatus to communicate the second signal at a configured relative location within the second radio frame that is different to the predetermined relative location within the first radio frame.

According to one aspect of the present invention there is provided a mobile communication device for communicating with communication apparatus in a cellular communication system using a plurality of radio frames, the mobile communication device comprising: means for communicating in a communication cell on an associated component carrier controlled by the communication apparatus; means for identifying a configured relative location, within a radio frame, within which configured relative location a signal comprising at least one of a synchronisation signal and a reference signal is to be transmitted, the configured relative location being a location within the radio frame relative both to a time range spanned by the radio frame and to a frequency range spanned by the radio frame; and means for receiving the signal at the identified configured relative location within the radio frame; wherein the configured relative location may comprise any of a plurality of relative locations and wherein the identifying means is operable to determine which of the plurality of relative locations the configured relative location comprises.

According to one aspect of the present invention there is provided a mobile communication device for communicating with communication apparatus in a cellular communication system using a plurality of radio frames, the mobile communication device comprising: means for communicating in any of a plurality of communication cells, each being provided on a respective component carrier operated by the communication apparatus; means for receiving a first signal within a first radio frame transmitted in a first of the plurality of cells using a first component carrier, the first signal being transmitted at a predetermined relative location within the radio frame relative both to a time range spanned by the first radio frame and to a frequency range spanned by the first radio frame; and means for identifying a configured relative location, within a radio frame, within which location a second signal is to be transmitted, the configured relative location being a location within the radio frame relative both to a time range spanned by the radio frame and to a frequency range spanned by the radio frame; wherein the receiving means is further operable to receive a second signal at the configured relative location within the second radio frame; wherein the first and second signals are of the same type as one another, each comprising at least one of a synchronisation signal and a reference signal; and wherein the identifying means is operable to identify a configured relative location within the second radio frame that is different to the predetermined relative location within the first radio frame.

The identifying means may be operable to infer the configured relative location of the second signal based on timing information obtained the first signal. The identifying means may be operable to identify the configured relative location from information communicated by the communication apparatus for identifying the configured relative location.

The information for identifying the configured relative location may comprise a configuration index from which the configured relative location may be derived.

The link between possible configuration indexes and possible configured relative locations may be represented by a look-up table in a memory of the mobile communication device.

The link between possible configuration indexes and possible configured relative locations may be represented by one or more equations in a memory of the mobile communication device.

The information for identifying the configured relative location may comprise an explicit indication of the configured relative location. The information for identifying the configured relative location may comprise a cell identity of the cell in which the signal, or second signal, is communicated.

The identifying means may be operable to identify the configured relative location by conducting a search for signals comprising the at least one of a synchronisation signal and a reference signal and for identifying the configured relative location from a signal detected during the search.

The signal (or each of the first and second signals) may comprises a synchronisation signal and the mobile communication device may further comprise means for synchronising with the communication apparatus in dependence on the synchronisation signals.

The signal (or each of the first and second signals) may comprises a primary or secondary synchronisation signal.

According to one aspect of the present invention there is provided a method performed by communication apparatus for communicating with a plurality of mobile communication devices in a cellular communication system using a plurality of radio frames the method comprising: operating a communication cell on an associated component carrier; configuring the apparatus to communicate a signal comprising at least one of a synchronisation signal and a reference signal at a configured relative location within a radio frame to be transmitted in the communication cell using the component carrier, the configured relative location being a location within the radio frame relative both to a time range spanned by the radio frame and to a frequency range spanned by the radio frame; and communicating a signal at the configured relative location within the radio frame; wherein the configuring step comprises configuring the apparatus to communicate the signal at any of a plurality of relative locations within the radio frame.

According to one aspect of the present invention there is provided a method performed by communication apparatus for communicating with a plurality of mobile communication devices in a cellular communication system using a plurality of radio frames, the method comprising: operating a plurality of communication cells on respective component carriers; communicating a first signal within a first radio frame transmitted in a first of the plurality of cells using a first component carrier, the first signal being transmitted at a predetermined relative location within the radio frame relative both to a time range spanned by the first radio frame and to a frequency range spanned by the first radio frame; configuring the apparatus to communicate a second signal at a configured relative location within a second radio frame to be transmitted in a second of the plurality of cells using a second component carrier, the configured relative location being a location within the radio frame relative both to a time range spanned by the second radio frame and to a frequency range spanned by the second radio frame; and communicating a second signal at the configured relative location within the second radio frame; wherein the first and second signals are of the same type as one another, each comprising at least one of a synchronisation signal and a reference signal; and wherein the configuring step comprises configuring the apparatus to communicate the second signal at a configured relative location within the second radio frame that is different to the predetermined relative location within the first radio frame.

According to one aspect of the present invention there is provided a method performed by a mobile communication device for communicating with communication apparatus in a cellular communication system using a plurality of radio frames the method comprising:

communicating in a communication cell on an associated component carrier controlled by the communication apparatus; identifying a configured relative location, within a radio frame, within which configured relative location a signal comprising at least one of a synchronisation signal and a reference signal is to be transmitted, the configured relative location being a location within the radio frame relative both to a time range spanned by the radio frame and to a frequency range spanned by the radio frame; and receiving the signal at the identified configured relative location within the radio frame; wherein the configured relative location may comprise any of a plurality of relative locations and wherein the identifying means is operable to determine which of the plurality of relative locations the configured relative location comprises.

According to one aspect of the present invention there is provided a method performed by a mobile communication device for communicating with communication apparatus in a cellular communication system using a plurality of radio frames the mobile communication device comprising: communicating in any of a plurality of communication cells, each being provided on a respective component carrier operated by the communication apparatus; receiving a first signal within a first radio frame transmitted in a first of the plurality of cells using a first component carrier, the first signal being transmitted at a predetermined relative location within the radio frame relative both to a time range spanned by the first radio frame and to a frequency range spanned by the first radio frame; identifying a configured relative location, within a radio frame, within which location a second signal is to be transmitted, the configured relative location being a location within the radio frame relative both to a time range spanned by the radio frame and to a frequency range spanned by the radio frame; and receiving a second signal at the configured relative location within the second radio frame; wherein the first and second signals are of the same type as one another, each comprising at least one of a synchronisation signal and a reference signal; and wherein the identifying means is operable to identify a configured relative location within the second radio frame that is different to the predetermined relative location within the first radio frame.

Aspects of the invention extend to computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

BRIEF DESCRIPTION OF THE DRAWINGS

Embodiments of the invention will now be described by way of example only with reference to the attached figures in which.

DETAILED DESCRIPTION OF EXEMPLARY EMBODIMENTS

Overview

Figure 1:
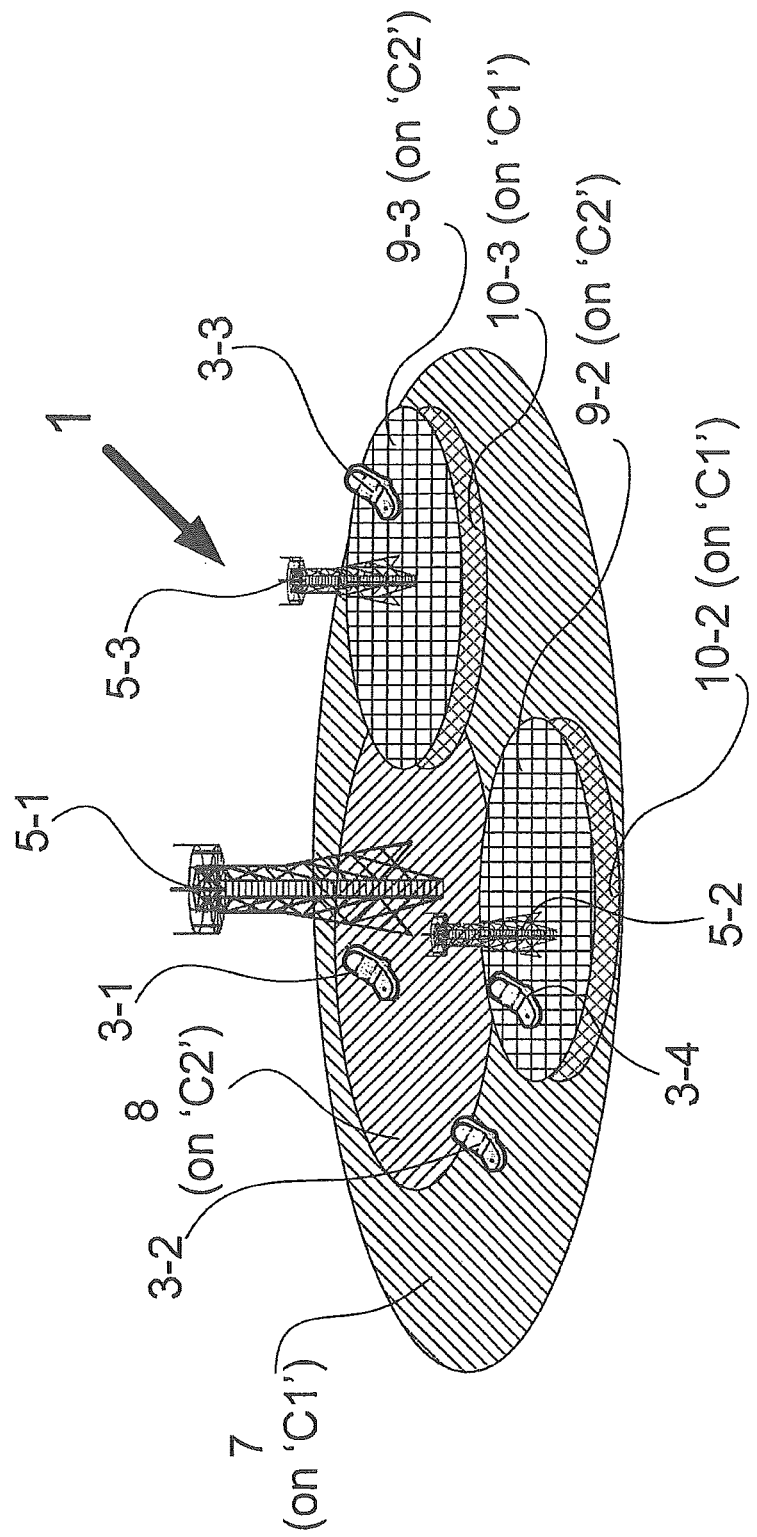
FIG. 1 schematically illustrates a telecommunication system.

FIG. 1 schematically illustrates a mobile (cellular) telecommunication system 1 in which a user of any of a plurality of mobile communication devices 3-1, 3-2, 3-3, 3-4, can communicate with other users via one or more of a plurality of base stations 5-1, 5-2 and 5-3. In the system illustrated in FIG. 1, each base station 5 shown is an Evolved Universal Terrestrial Radio Access Network (E-UTRAN) base station capable of operating in a multi-carrier environment.

In FIG. 1, the base station labelled 5-1 comprises a so called 'macro' base station operating a plurality of relatively geographically large 'macro' cells 7, 8 using respective component carriers (CCs) C1, C2, of a component carrier set. In this embodiment, the macro base station 5-1 operates component carrier C1 as a primary component carrier on which a primary cell (PCell) 7 is provided, and component carrier C2 as a secondary component carrier on which a secondary cell (SCell) 8 is provided. The PCell 7 has a larger geographical coverage than the SCell 8. The difference in the size of the PCell 7 and SCell 8 may be by design (e.g. as a result of using a lower transmit power for component carrier C2) or may result from one or more radio environmental factors affecting the primary carrier C1 and secondary carrier C2 to different extents (e.g. path loss affecting a lower frequency primary carrier C1 to a lesser extent than a higher frequency secondary carrier C2).

The other base stations 5-2, 5-3 shown in FIG. 1, each comprises a so called 'pico' base station (or possibly so called 'Radio Remote Head (RRH)') operating a plurality of 'pico' cells 9-2, 9-3, 10-2, 10-3, using a component carrier set having component carriers (CCs) C1, C2 corresponding in frequency to those used by the macro-base station 5-1. Each pico base station 5-2, 5-3 operates a respective pico primary cell (PCell) 9-2, 9-3 on component carrier C2 and a respective pico secondary cell (SCell) 10-2, 10-3 on component carrier C1. Thus, the pico Pcells 9 share substantially the same frequency band as the macro SCell 8, and the pico SCells 10 share substantially the same frequency band as the macro PCell 7. As seen in FIG. 1, the power of the carriers C1, C2 used to provide the pico cells 9, 10 is set such that the geographical coverage of the pico PCells 9, of this example, are substantially co-incident with the geographical coverage of the pico SCells 10.

The power used to provide pico cells 9, 10 is low relative to the power used for the macro cells 7, 8 and the pico cells 9, 10 are therefore small relative to the macro cells 7, 8. As shown in FIG. 1, in this example the geographical coverage of each of the pico cells 9, 10 falls completely within the geographical coverage of the macro PCell 7 and overlaps partially with the geographical coverage of the macro SCell 7.

To alleviate the issue of intercell interference, the component carrier C2 used for the macro SCell 8 is operated by the macro base station 5-1 as an extension carrier on which the nature of information that may be transmitted is restricted. Specifically, the component carrier, when operating as the extension carrier may not be used for transmission of any of the following:
  a Physical Downlink Control Channel (PDCCH);
  a Physical Hybrid ARQ Indicator Channel (PHICH);
  a Physical Control Format Indicator Channel (PCFICH);
  a Physical Broadcast Channel (PBCH); or
  a Common Reference Signal/Cell-specific Reference Signal (CRS).

Accordingly, the extension carrier is effectively a 'PDCCH-less' carrier that cannot be operated as a single (stand-alone) carrier, and must therefore be operated a part of a component carrier set where at least one of the carriers in the set is a stand-alone-capable carrier. The macro base station 5-1 operates carrier C1 as a stand-alone carrier on which the PDCCH is used to schedule the resources of component carrier C2 to be used for communication purposes by a mobile communication device 3 when operating in the macro SCell 8.

The respective component carrier C1 used for each of the pico SCells 10 is also each operated as an extension carrier (as described previously) by the associated pico base station 5-2, 5-3. The respective component carrier C2 used for each of the pico Pcells 9 is operated, as a stand-alone carrier, by the associated pico base station 5-2, 5-3, and is used for cross carrier scheduling of the resources of component carrier C1 to be used for communication purposes by a mobile communication device 3 when operating in the associated pico SCell 10.

Each base station 5 is also configured to provide signals in each radio frame 210 on the primary (backwards compatible) component carrier by which the mobile communication devices 3 may achieve synchronisation with the base station 5 for the associated PCell 7, 9. Specifically, the base station 5 transmits a primary synchronisation signal (PSS) and a secondary synchronisation signal (SSS) on the primary (backwards compatible) component carrier, at predetermined fixed locations (in both frequency and time) within each radio frame as set out in 3GPP TS 36.211 V10.2.0.

Rather than relying on the signals transmitted on the primary component carrier for synchronisation with the SCell 8, 10, each base station 5 is also configured to provide separate synchronisation signals in each radio frame 210 (see FIG. 4) on the secondary (extension) component carrier by which the mobile communication devices 3 may achieve synchronisation with the base station 5 for the associated SCell 8, 10. Specifically, the base station 5 also transmits a primary synchronisation signal (PSS) and a secondary synchronisation signal (SSS) on the secondary component carrier. Unlike the PSS and SSS transmitted on the primary component carrier, however, the location of the PSS and SSS within each radio frame is configurable on a per-base station 5 basis (and a per-carrier basis where multiple secondary carriers are used). The configurable location of the PSS and SSS is particularly beneficial because it allows neighbouring base stations 5 and base stations 5 whose cells share a common geographic area and/or frequency band to avoid inter-cell interference between the PSS/SSS transmitted by one base station 5 and the PSS/SSS transmitted by another base station 5.

It will be appreciated, however, that reuse of the PSS and SSS in the SCell 8, 10 (even at different locations in a radio frame) carries with it a risk that a legacy (e.g. release 10 mobile communication device) may detect it during a cell search procedure and mistake it for a normal release 10 cell. To avoid this, the structure of the PSS/SSS for the SCell 8, 10 is modified such that release 10 mobile communication devices will ignore the PSS/SSS whilst maintaining the required synchronisation performance for release 11 mobile communication devices 3. Specifically, in this embodiment, the relative positions of the PSS and SSS are swapped compared with their expected positions (e.g. as transmitted on the primary component carrier).

Base Station

Figure 2:
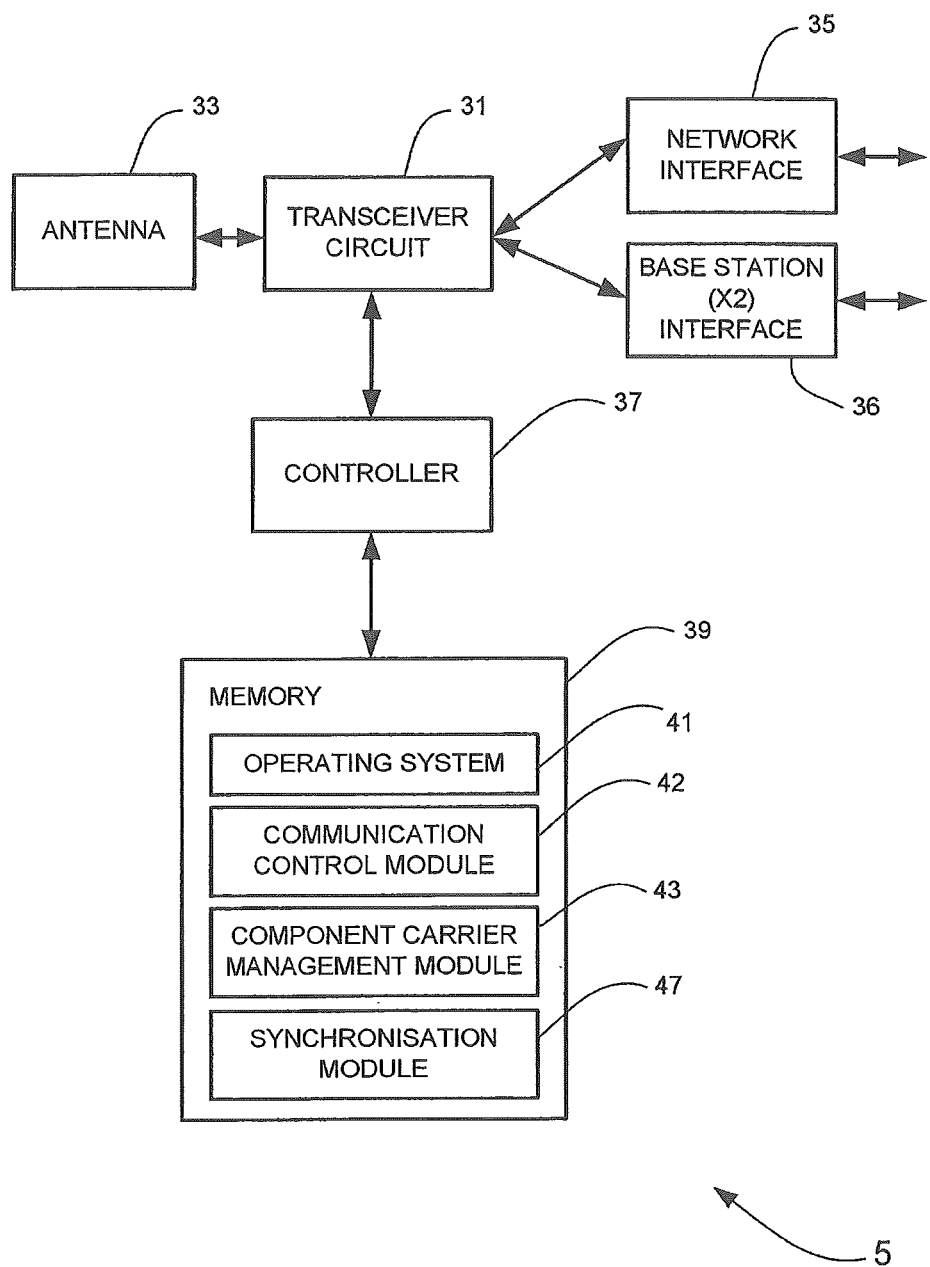
FIG. 2 shows a simplified block diagram of a base station for the telecommunication system of FIG. 1.

FIG. 2 is a block diagram illustrating the main components of the base stations 5 shown in FIG. 1. For clarity, the base stations will be described with reference to the macro base station 5-1, but it will be appreciated that each of the pico base stations 5-2, 5-3 may be configured similarly. The macro base station 5-1 comprises an E-UTRAN multi-carrier capable base station comprising a transceiver circuit 31 which is operable to transmit signals to, and to receive signals from, the mobile communication devices 3 via at least one antenna 33. The base station 5-1 is also operable to transmit signals to and to receive signals from: a core network via a network interface 35; and other base stations 5 in the vicinity via a base station (or so called 'X2') interface. The operation of the transceiver circuit 31 is controlled by a controller 37 in accordance with software stored in memory 39.

The software includes, among other things, an operating system 41, a communication control module 42, a component carrier management module 43, and a synchronisation module 47.

The communication control module 42 is operable to control communication with the mobile communication devices 3 on the component carriers (CCs) C1, C2, of its component carrier set and with the core network and other base stations via the network interface 35 and the X2 interface 36 respectively. The component carrier management module 43 is operable to manage the use of the component carriers C1, C2 and in particular the configuration and operation of the component carriers C1, C2 as a backwards compatible standalone carrier for a PCell 7 or as an extension carrier for an SCell 8. The synchronisation module 47 manages the transmission of synchronisation signals at appropriate locations in each radio frame 210.

In the above description, the base station 5-1 is described for ease of understanding as having a number of discrete modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

Mobile Communication Device

Figure 3:
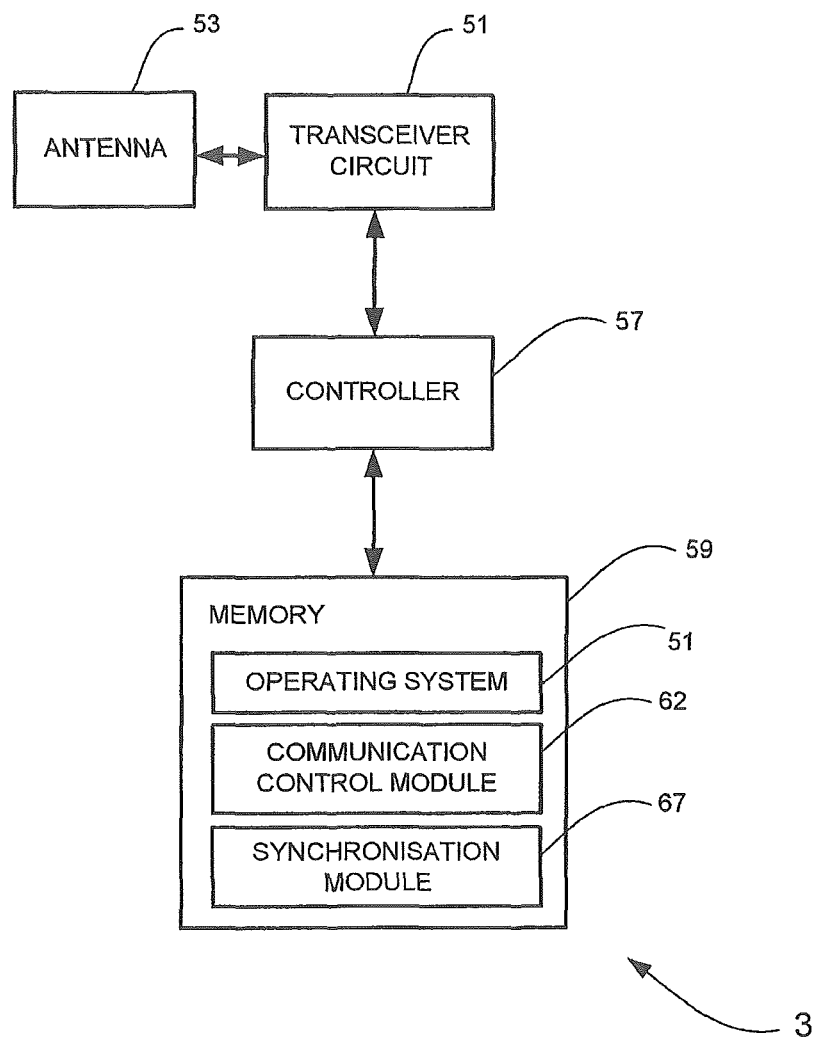
FIG. 3 shows a simplified block diagram of a mobile communication device for the telecommunication system of FIG. 1.

FIG. 3 is a block diagram illustrating the main components of the mobile communication devices 3 shown in FIG. 1. Each mobile communication device 3 comprises a mobile (or 'cell' telephone) capable of operating in a multi-carrier environment. The mobile communication device 3 comprises a transceiver circuit 51 which is operable to transmit signals to, and to receive signals from, the base stations 5 via at least one antenna 53. The operation of the transceiver circuit 51 is controlled by a controller 57 in accordance with software stored in memory 59.

The software includes, among other things, an operating system 51, a communication control module 62, and a synchronisation module 67.

The communication control module 62 is operable for managing communication with the base stations 5 on the associated component carriers (CCs) C1, C2. The synchronisation module 67 manages synchronisation of the mobile communication device 3 with the radio frame/subframe timing of the base station 5 for example with the frame/subframe timing of the PCell 7, 9 and the SCell 8, 10. The synchronisation module 67 also manages the identification of the synchronisation configuration for the SCell 8, 10 such as the location of the PSS/SSS within each radio frame 210.

In the above description, the mobile communication device 3 is described for ease of understanding as having a number of discrete modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

Synchronisation Signal Configuration

The way in which the synchronisation signals are configured in the present embodiment will now be described in more detail, by way of example only, with reference to FIGS. 4 to 6.

Figure 4:
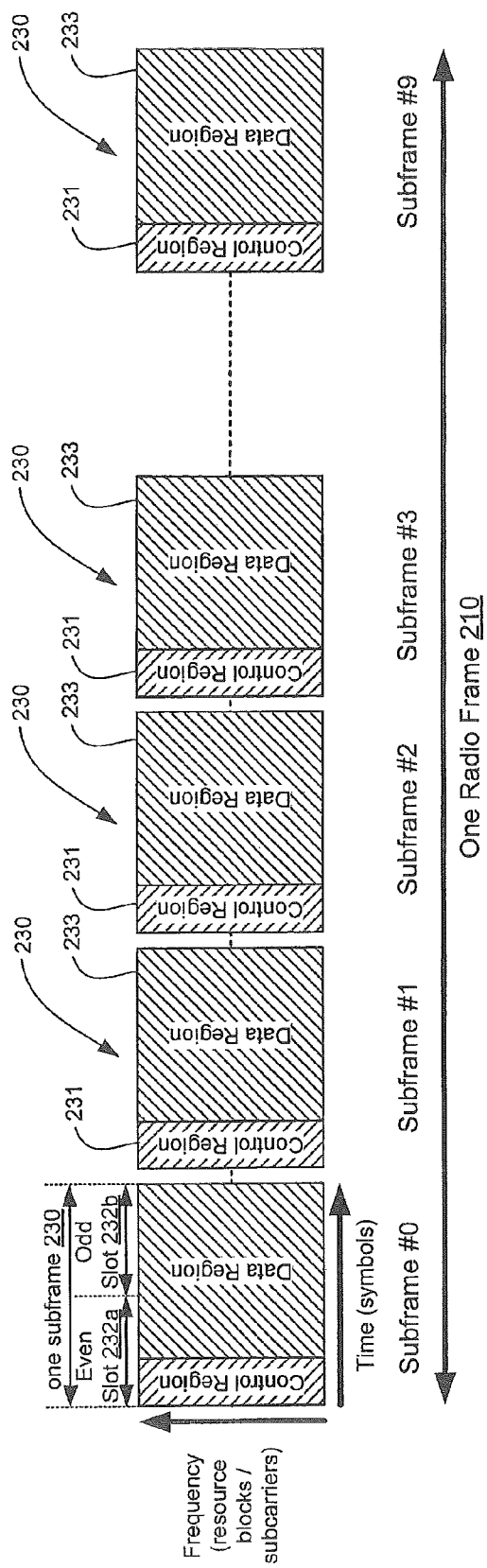
FIG. 4 shows an illustration of a typical radio frame used for communication in the telecommunication system of FIG. 1.

FIG. 4 illustrates the structure of a radio frame 210 of the type used for communication by the base stations 5 and mobile communication devices 3 of the communication system 1. As seen in FIG. 4, each base station 5 is configured to transmit control information and data to associated mobile communication devices using radio frames 210. Each radio frame 210, in this embodiment, is 10 ms long and as seen in FIG. 4 comprises a plurality of orthogonal frequency division multiplexing (OFDM) subframes 230 (in this embodiment ten 1 ms subframes which are indexed '0' through '9' make up a radio frame 210). Each subframe comprises a pair of slots 232a and 232b (in this embodiment 0.5 ms long). For the purposes of referencing, the slots 232 are typically referred to by index numbers ranging from '0' to '19' in chronological order (from left to right on FIG. 4) with the first slot 232a of each subframe 230 having an even number and the second slot 232b having an odd number. Part of the first ('even numbered') slot of each subframe 230 comprises a so called 'control' region 231 that is generally reserved for the transmission of control information. The remainder of the first ('even numbered') slot of each subframe 230 and the second ('odd numbered') slot of each subframe 230 comprises a so called 'data' region 233 that is generally used for the transmission of data, for example in a Physical Downlink Shared Channel (PDSCH).

Figure 5:
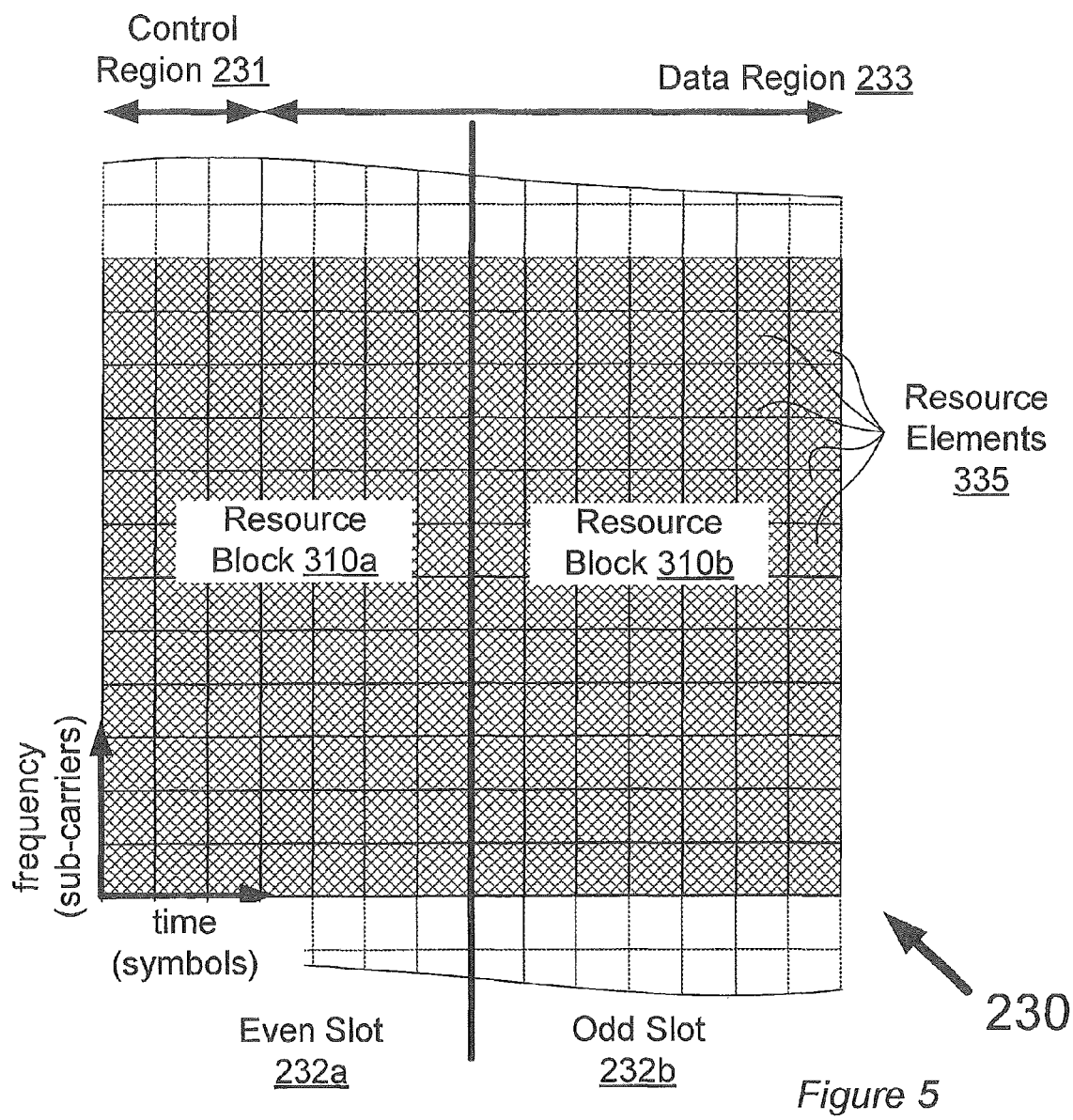
FIG. 5 shows an illustration of part of a typical subframe of the radio frame used for communication in the telecommunication system of FIG. 1.

FIG. 5 shows a resource grid for one of the OFDM subframes 230 of FIG. 4. The resource grid shown is for a resource block (RB) pair 310a, 310b (represented by hatched region) with each RB 310a, 310b of the pair having, for example, a resource grid similar to that described in section 6.2 of the 3$^{rd}$ Generation Partnership Project (3GPP) Technical Standard (TS) 36.211 V10.2.0 and shown in FIG. 6.2.2-1 of that standard.

As seen in FIG. 5, each resource block 310a and 310b is part of a respective slot 232a and 232b of the subframe 230. Each resource block 310a, 310b comprises a set of resource elements 335 defined in frequency by 12 subcarrier frequencies (rows) and in time by 7 symbols (columns) In this embodiment, the control region 231 comprises the resource elements 335 of the first three OFDM symbols of the first slot 232a of each subframe 230. The remaining resource elements 335 of the first slot 232a and the resource elements 335 of the second slot 232b form the data region 333.

As described above, each base station 5 is configured to provide synchronisation signals (PSS/SSS) at particular locations (in frequency and time) in each radio frame 210 to allow the mobile communication device 3 to achieve synchronisation with the base station 5. The PSS is used by the mobile communication device 3 to synchronise receipt and transmission of each symbol, slot and subframe with the corresponding symbol, slot and/or subframe timings of the base station 5. Further, the PSS is also used by the mobile communication device 3 to identify other information about the cell to which they relate, for example, cell identity information such as a physical layer cell identity (PCI). The SSS is used by the mobile communication device 3 to synchronise receipt and transmission of each radio frame 210 (FIG. 4) with the associated frame timings of the base station 5. The SSS is also used by the mobile communication device 3 to identify other information about the cell to which they relate, for example cell group identity information such as the physical layer cell identity group for the base station 5.

Figure 6:
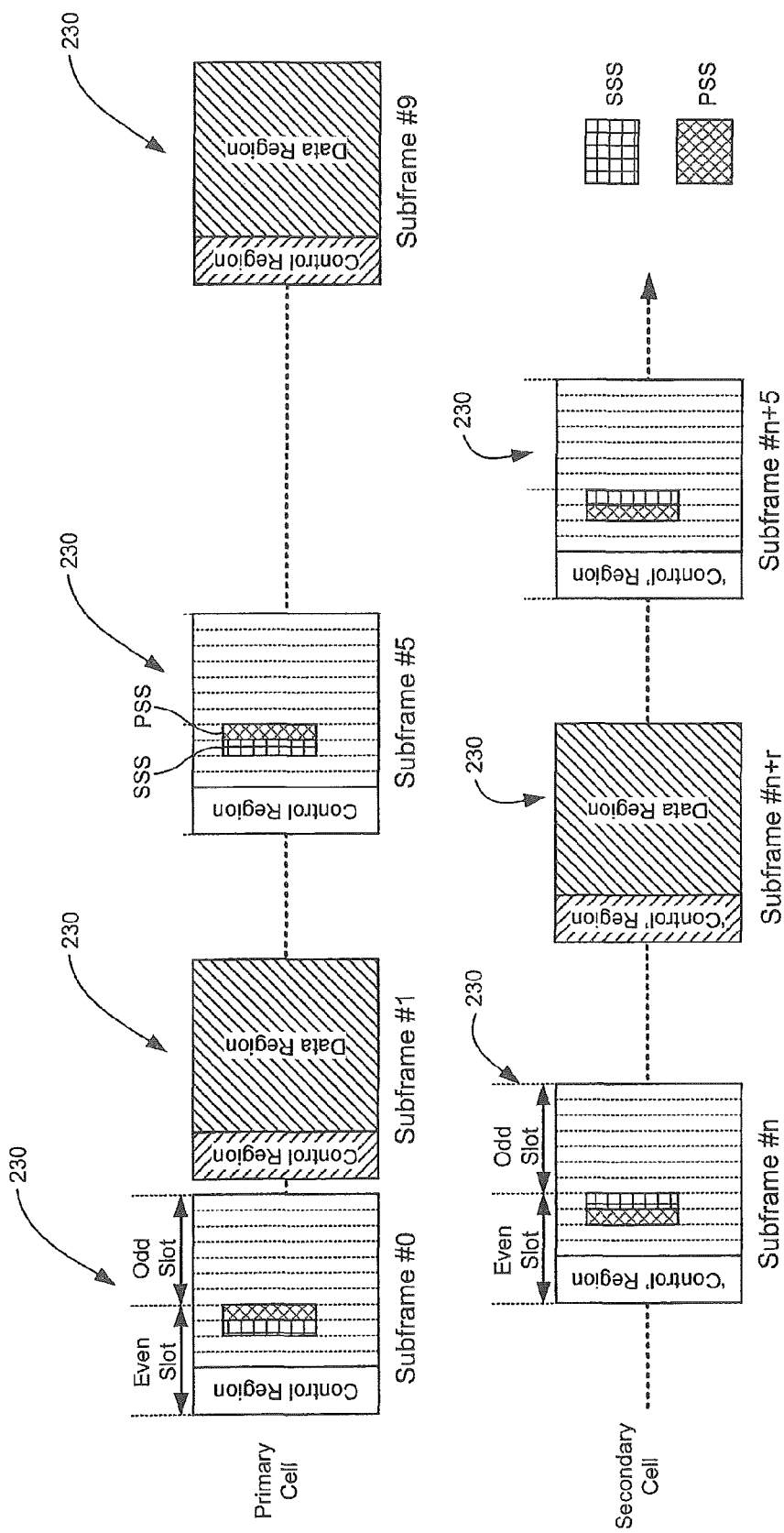
FIG. 6 shows an illustration of how synchronisation signals may be transmitted in a primary cell and a secondary cell of the telecommunication system of FIG. 1.

FIG. 6 illustrates how the synchronisation signals are configured in the radio frames 210 for the primary cell 7, 9 and the secondary cell 8, 10 respectively.

As seen in FIG. 6, in the case of the primary cell 7, 9, each base station 5 always provides the synchronisation signals (PSS/SSS) in the last two symbols of the first (even numbered) slot 232a in the first subframe 230 (subframe #0) and in the last two symbols of the first (even numbered) slot 232a in the sixth subframe 230 (subframe #5). The PSS is transmitted in the last symbol of the first slot 232a of the first and sixth subframes, whilst the SSS is transmitted in the second to last symbol of the first slot 232a of the first and sixth subframes 230 (i.e. the last symbol of slot #0 and slot #10).

The PSS and SSS are each allocated the central 62 subcarriers belonging to symbols in which they are respectively located. The 5 resource elements above and below the synchronisation signals are not used for transmission. They represent periods of Discontinuous Transmission (DTX). Thus, the PSS and SSS transmissions each use six resource blocks (with 10 resource elements left unused) and the indexes of the resource blocks (resource block numbers) within the frequency band covered by the primary component carrier are always the same.

The sequence d(n) used for the PSS is generated from a frequency-domain Zadoff-Chu sequence as follows:

$$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases}$$

where the Zadoff-Chu root sequence index u depends on the PCI and is one of the indices 25, 29 and 34.

The sequence d(0), d(61) used for the SSS comprises an interleaved concatenation of two length-31 binary sequences. The concatenated sequence is scrambled with a scrambling sequence given by the PSS.

The combination of two length-31 sequences defining the secondary synchronization signal differs between subframe #0 and subframe #5 according to:

$$d(2n) = \begin{cases} s_0^{(m_0)}(n)c_0(n) & \text{in subframe } 0 \\ s_1^{(m_1)}(n)c_0(n) & \text{in subframe } 5 \end{cases}$$

where 0≤n≤30. The indices $m_0$ and $m_1$ are derived from the physical-layer cell-identity group.

Thus, the two PSS transmissions within a radio frame 210 are identical. The two SSS transmissions within each radio frame 210, however, use different sequences to allow the mobile communication device 3 to differentiate between the $1^{st}$ and $2^{nd}$ transmission thereby allowing the mobile communication device 3 to achieve frame synchronisation.

As a skilled person will understand, further details on the implementation of the PSS and SSS may be found in TS 36.211 section 6.11.1 and 6.11.2 respectively.

In this embodiment, in the case of the secondary cell 8, 10, each base station 5 still provides the synchronisation signals (PSS/SSS) in the last two symbols of the respective first (even numbered) slots 232*a* of two different subframes (subframes #n and #n+5, where 'n' is the index of the first subframe). However, unlike the case of the primary cell 7, 9, the actual subframes 230 used are configurable so that different base stations 5 can use different subframes 230 for transmitting their synchronisation signals. Further, in this embodiment, the symbol positions used for the PSS and the SSS are swapped relative to the symbol positions used for the primary cell 7, 9. Specifically, the PSS is transmitted in the second to last symbol of the first slot 232*a* of subframe #n and subframe #(n+5), whilst the SSS is transmitted in the last symbol of the first slot 232*a* of subframe #n and subframe #(n+5).

Accordingly, one base station 5 is able to use the $1^{st}$ and $6^{th}$ subframes 230 (subframes #0 and #5) for synchronisation signals in the associated SCell 8, 10, whilst another base station 5 is able to use the $2^{nd}$ and $7^{th}$ subframes 230 (subframes #1 and #6) and yet another base station 5 is able to use the $3^{rd}$ and $8^{th}$ subframes 230 (subframes #2 and #7). Thus, interference between the synchronisation signals transmitted by the different base stations 5 is beneficially avoided.

Further, because the positions used for the PSS and the SSS are swapped relative to the symbol positions used for the primary cell 7, 9 a legacy mobile communication device 3 (e.g. a release 10 type device) that is not configured to operate with extension carriers will not inadvertently detect the PSS and SSS for the secondary cell 8, 10 during a cell search procedure and will not, therefore, mistake it for a normal release 10 cell.

Identifying Synchronisation Configuration for an SCell

The way in which a mobile communication device identifies the synchronisation configuration for a particular SCell 8, 10 will now be described, by way of example only, with reference to FIG. 7.

Figure 7:
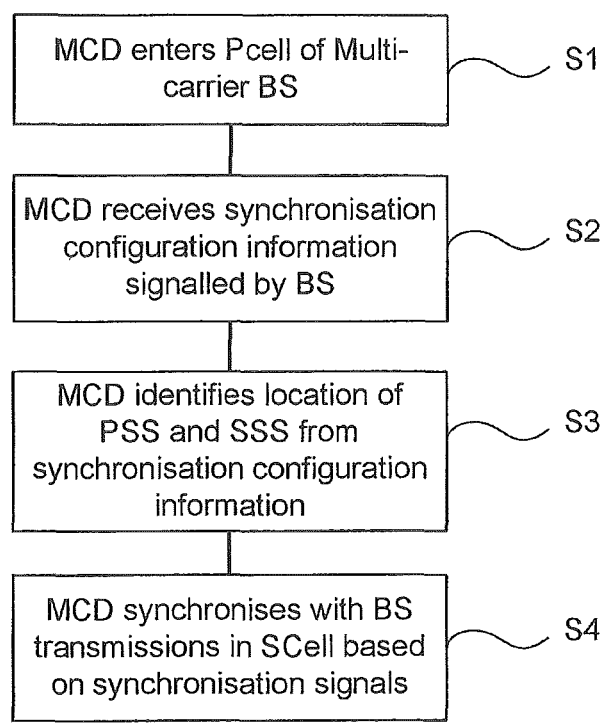
FIG. 7 shows a simplified flow chart of how a mobile communication device of the telecommunication system of FIG. 1 may operate to determine the location of synchronisation signalling in the radio frame.

FIG. 7 shows a flow chart illustrating one method by which a mobile communication device 3 may identify the location of the PSS and SSS of an SCell 8, 10.

In this embodiment, when a mobile communication device 3 first enters the PCell 7, 8 of a base station 5 that operates an SCell 9, 10 at S1, it detects information for identifying the PSS and SSS configuration of the SCell 8, 10 that is signalled by base station 5 at S2.

Advantageously, in this embodiment, the base station 5 signals a configuration index from which the location of the synchronisation signals can be derived thereby avoiding unnecessary signalling overhead. An example of a possible relationship between the configuration index and indexes of the subframes 230 used for transmitting the PSS and SSS is illustrated in Table 1 below:

TABLE 1

Example of PSS/SSS configuration index

| PSS/SSS Configuration Index | Subframe numbers used for PSS/SSS transmission |
| --- | --- |
| 0 | None (PSS/SSS not applied on SCell) |
| 1 | 0, 5 |
| 2 | 1, 6 |
| 3 | 2, 7 |
| 4 | 3, 8 |
| 5 | 4, 9 |

In this embodiment, the link between the configuration index and the indexes of the subframes 230 used for transmitting the PSS and SSS is represented in the memory of the mobile communication device 3 and the base station 5 as a look-up table.

On receipt of the configuration information, the mobile communication device 3 determines the location of the PSS and SSS for the SCell 8, 10 at S3. The mobile communication device 3 is then able to successfully receive and interpret the PSS and SSS on the secondary component carrier of the SCell 8, 10 and thereby achieve synchronisation with the frame, subframe, slot and symbol timings of the SCell 8, 10 even if they are different to those of the PCell 7, 9 by virtue of a timing error or the like.

Selecting Appropriate Synchronisation Configuration

Figure 8:
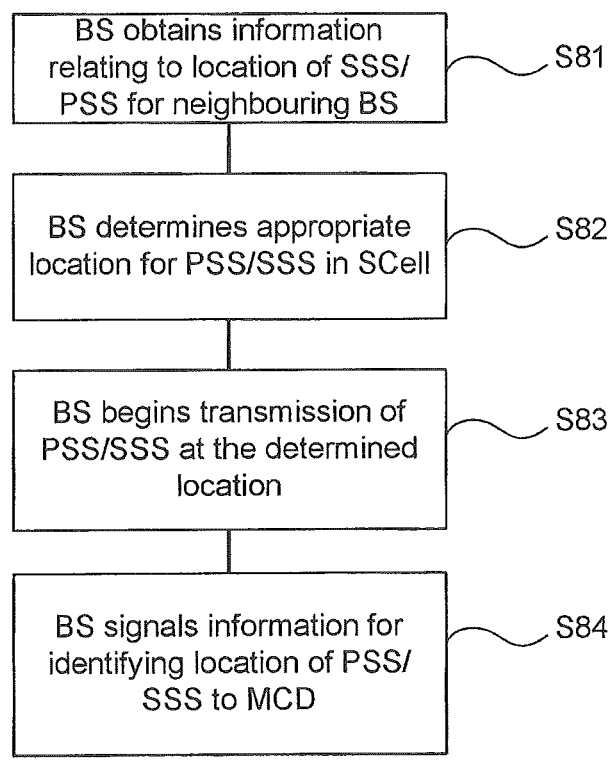
FIG. 8 shows a simplified flow chart of how a base station of the telecommunication system of FIG. 1 may operate to determine the location of where synchronisation signalling should be transmitted in the radio frame.

The way in which a base station 5 determines an appropriate PSS and SSS configuration for the SCell 8, 10 will now be described, by way of example, with reference to FIG. 8.

Initially, the base station 5 identifies the radio frame locations (e.g. subframe indices) being used by nearby base stations 5 (e.g. operating neighbouring or overlapping cells) for PSS/SSS transmissions. In this embodiment this is achieved by acquiring information representing the radio frame locations via base station 5 to base station 5 signalling over the X2 interface at S81 and then determining the locations from the acquired information.

The base station 5 then selects, at S82, appropriate radio frame locations for its own PSS/SSS transmissions in the SCell 8, 10 to avoid or reduce the potential impact of cell to cell interference between the PSS/SSS being transmitted by the other base stations 5 in the vicinity. The base station begins transmission of the PSS/SSS in the selected radio frame locations at S83 and, in this embodiment, signals information for use in identifying the radio frame locations being used at S84.

Modifications and Alternatives

A detailed embodiment and has been described above. As those skilled in the art will appreciate, a number of modifications and alternatives can be made to the above embodiment and variations whilst still benefiting from the inventions embodied therein.

Figure 9:
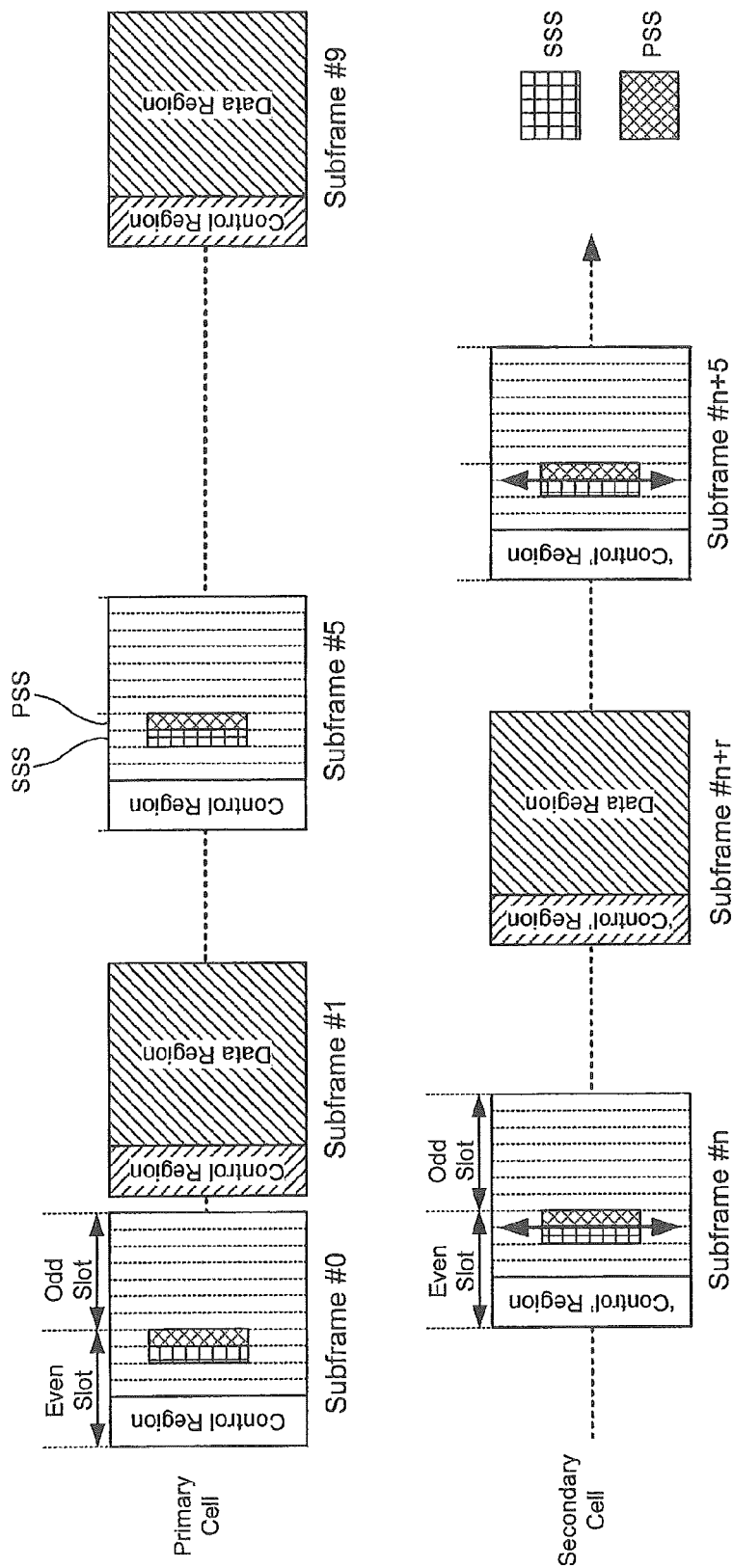
FIG. 9 shows an illustration of another example of how synchronisation signals may be transmitted in a primary cell and a secondary cell of the telecommunication system of FIG. 1.

Referring to FIG. 9, for example, in another embodiment in addition to (or as an alternative to) the subframes 230 used for the PSS and SSS transmissions in the SCells 8, 10 being configurable, the frequencies used (as defined by the indexes of the resource blocks used) for the PSS and/or SSS transmissions may be configurable thereby providing additional flexibility to configure the PSS and SSS and thereby enhance protection against cell to cell interference. Further, in addition to (or as an alternative to) the subframes 230 (and/or frequency) used for the PSS and SSS transmissions in the SCells 8, 10 being configurable, the symbols could potentially be configurable.

Figure 10:
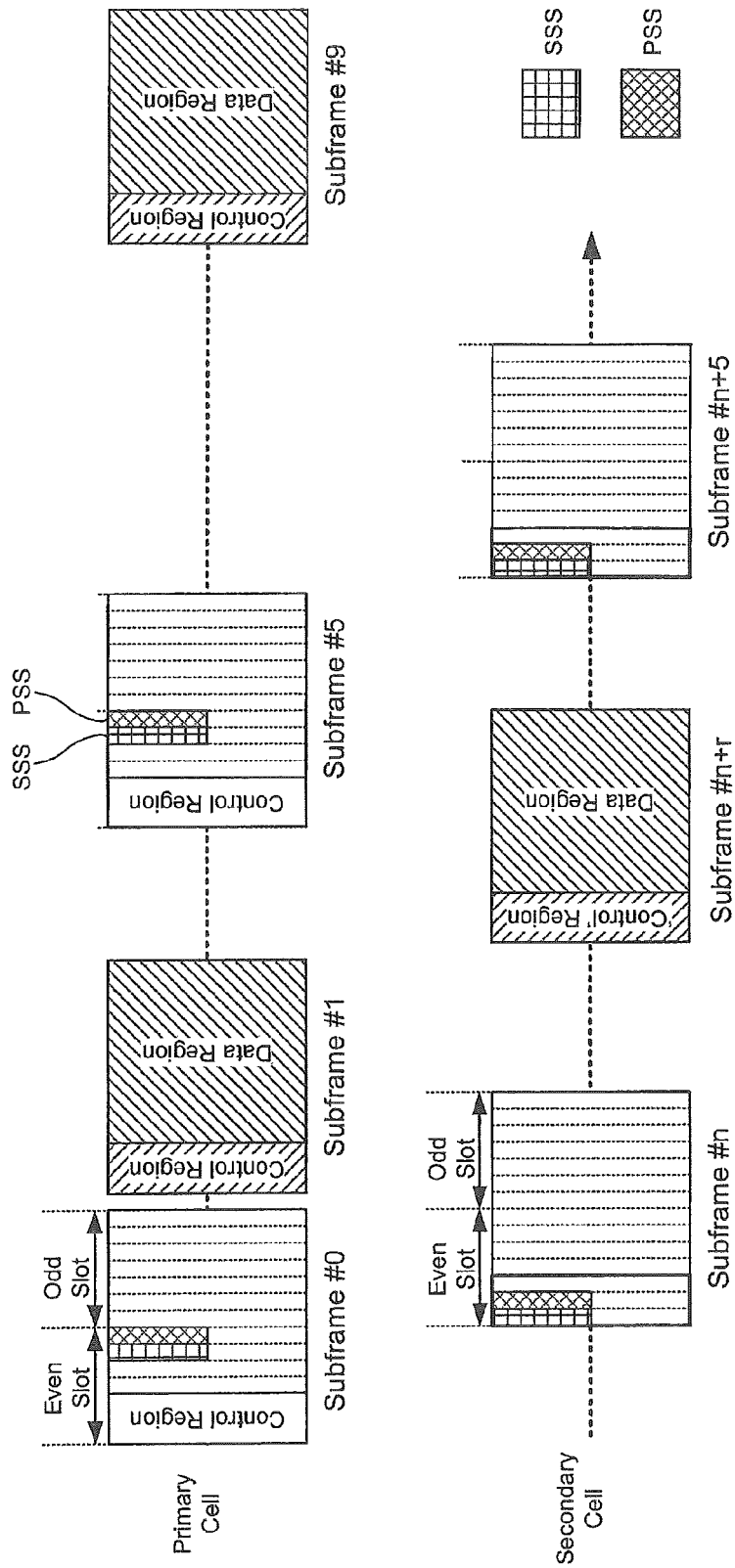
FIG. 10 shows an illustration of another example of how synchronisation signals may be transmitted in a primary cell and a secondary cell of the telecommunication system of FIG. 1.

Referring to FIG. 10, in another embodiment in addition to (or as an alternative to) the subframes 230 (and/or frequency) used for the PSS and SSS transmissions in the SCells 8, 10 being configurable, advantageous use may be made of the fact that the control region is not used for the control channel and other signalling. Specifically, instead of using the last two symbols of the even slots in subframes #n and #n+5, two symbols from the control region (e.g. the first two symbols) may be used. For example, in FDD, the SSS can be placed on the first OFDM symbol of subframes #n and #n+5 (e.g. subframes #1 and #6) and the PSS can be placed on the second OFDM symbol of those subframes 230.

Where the base station 5 signals the synchronisation configuration information to the mobile communication device 3 directly, the signalling may comprise the broadcast of information for identifying the location of the synchronisation signals (in time and/or frequency) or may comprise mobile communication device dedicated signalling.

Whilst maintaining the five subframe gap between the two subframes 230 in which the PSS and SSS are provided in the SCell 8, 10 is advantageous, there may be a different gap (or even possibly a single subframe could be used). Further although, in above embodiments, a configuration index is signalled from which the location of the synchronisation signals can be derived, the time (and/or frequency) location may be signalled explicitly.

Moreover, instead of the base station 5 that transmits the PSS and SSS signalling a configuration index, the information for identifying the location of the synchronisation signals may comprise cell identification information transmitted by a base station 5 (e.g. the Cell ID of an SCell 8, 10 which may be provided as part of a neighbour cell list provided by the base station 5). In this case, the mobile communication device 3 can infer the configuration index for the SCell 8, 10, and hence the indexes of the subframes used for the PSS and SSS in the SCell 8, 10, from the Cell ID (alternatively the indexes of the subframes used for the PSS and SSS in the neighbouring SCell 8, 10 could be determined directly from the Cell ID). For example, the configuration index (C) could be derived from the Cell ID using the following equation:

$$C = (Cell\_ID \bmod 5) + 1$$

or directly, where $i_1$ and $i_2$ are the indexes of the first and second subframes respectively as follows:

$$i_1 = (Cell\_ID \bmod 5); \text{ and}$$

$$i_2 = (Cell\_ID \bmod 5) + 5$$

The link between the configuration index and the indexes of the subframes 230 used for transmitting the PSS and SSS may be represented in the memory of the mobile communication device 3 and/or the base station 5 by an equation, software algorithm or the like, as an alternative to (or in addition to) a look-up table. For example, the configuration index (C) of the first and second subframes may be represented by the following equations in the base station 5:

$$C = 0 \text{ if PSS/SSS is not applied on SCell; and}$$

$$C = i_1 + 1; \text{ or}$$

$$C = i_2 + 4$$

Conversely, the subframe indexes may be represented by the following equations in the mobile communication device:

$$\text{PSS/SSS is not applied on SCell if } C = 0; \text{ and}$$

$$i_1 = C - 1; \text{ and}$$

$$i_2 = C - 4 \text{ or } i_2 = i_1 + 5$$

It will be appreciated that, whilst Table 1 above (and the above equations) only relate to the derivation and/or encoding of the subframe numbers for the PSS/SSS transmission in the SCell 8, 10 the same principles could be extended so that the frequencies (e.g. the physical resource block indexes) used for the PSS/SSS transmission could be derived directly from the configuration index (and/or Cell ID) as well.

Figure 11:
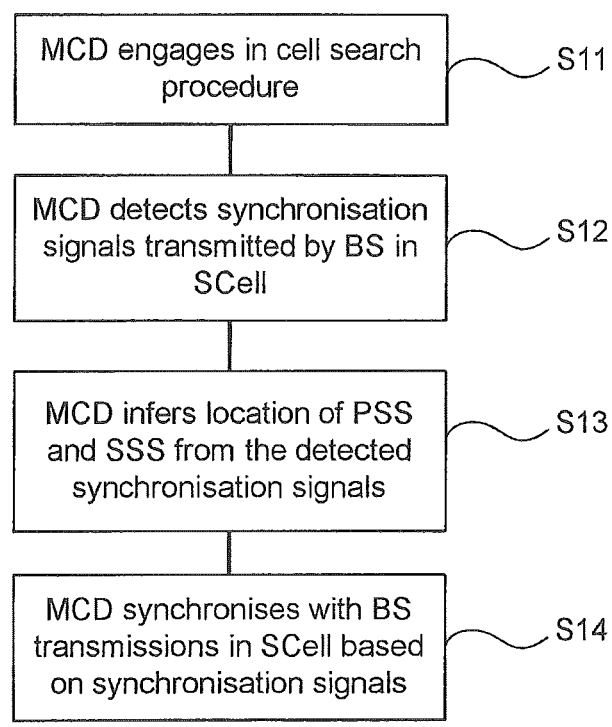
FIG. 11 shows a simplified flow chart of another example of how a mobile communication device of the telecommunication system of FIG. 1 may operate to determine the location of synchronisation signalling in the radio frame.

Whilst having the base station 5 inform the mobile communication device 3 of the time and frequency location of PSS/SSS on SCell 8, 10 directly using PCell communications has benefits in terms of speed (i.e. faster identification of SCell PSS/SSS location) it requires additional signalling. FIG. 11 shows another method by which a mobile communication device 3 can identify the synchronisation configuration which, whilst potentially slower, has the advantage that no additional base station signalling is required.

Referring to FIG. 11, in another embodiment as an alternative to (or in addition to) the information being explicitly signalled by the base station 5 to allow the mobile communication devices 3 to determine the location of the PSS/SSS within the radio frame (in time and/or frequency), the mobile communication device may be configured to infer the location of the PSS/SSS from PSSs/SSSs detected during a search procedure. As seen in FIG. 11 for example, the mobile communication device 3 can engage in a search procedure (S11) during which it detects (S12) any PSS/SSS being transmitted by base stations in the vicinity. In this example, when the search procedure is initiated, the mobile communication device 3 will already be in possession of the cell identity (Cell ID) of each SCell 8, 10 to which the search procedure relates (from base station signalling on the primary component carrier in the associated PCell 7, 9 for example). Accordingly, should the mobile communication device 3 detect a plurality of candidate PSSs and/or SSSs (for example from neighbouring/overlapping cells) the mobile communication device 3 is able to determine which of the plurality of candidate PSSs and/or SSSs belongs to the SCell(s) 8, 10 to which the search procedure relates by comparison of the known Cell ID(s) with the Cell IDs decoded from the PSS and SSS detected. The mobile communication device 3 can thus infer the location of the PSS/SSS for the SCell 8, 10 to which the PSS/SSS belongs (S13) and synchronise itself with the radio frame/subframe/slot/symbol timings in the SCell 8, 10 appropriately (S14).

For example, in the PSS/SSS identification procedure of FIG. 11, subframe numbers (indexes) used for PSS/SSS transmission may be inferred based on the reasonable assumption that the timing error between SCell 8, 10 and the associated PCell 7, 9 will always be much less than one subframe. Specifically, since the subframe timing of the PCell 7, 9 will already be known to the mobile communication device from standard PSS/SSS transmissions on the PCell 7, 9, when the PSS/SSS for the associated SCell 8, 10 is detected, the relative difference in the timing of the PSS/SSS in the SCell 8, 10 and the PSS/SSS in the PCell 7, 9 can be determined to within an accuracy of one subframe. Accordingly, the subframe index of the PSS/SSS in the SCell 8, 10 can be determined from the detected position of the PSS/SSS in the SCell 8, 10 relative to the PSS/SSS in the PCell 7, 9.

It will be appreciated, however, that the concept of PSS/SSS with flexible location may be applied to carriers which are not extension carriers (i.e. which are not associated with a specific PCell 8, 10). In this case, the mobile communication device 3 may not be able to determine the subframe numbers used for PSS/SSS from the PSS/SSS transmission alone and, therefore, the mobile communication device 3 may be unable to establish the subframe and radio frame timing from the PSS/SSS transmission. However, as discussed above, the existing release 10 PSS/SSS structure allows the UE to determine the Cell ID from the PSS/SSS transmission. Accordingly, where the PSS/SSS is applied to carriers which are not extension carriers, a fixed relationship could be maintained between the Cell ID and the time and/or frequency location of PSS/SSS such that once the Cell ID is known the time/frequency location of PSS/SSS can be inferred. For example, a configuration index (C) from which the indexes ($i_1$ and $i_2$) of the subframes used for the PSS and SSS may be determined (using any of the methods discussed above) may be inferred as follows:

$$C=(\text{Cell\_ID mod }5)+1$$

The indexes of the first and second subframes may alternatively (or additionally) be inferred directly as follows:

$$i_1=(\text{Cell\_ID mod }5);\text{ and}$$

$$i_2=(\text{Cell\_ID mod }5)+5$$

It will be appreciated that whilst, in the above embodiments, the position of the PSS and SSS for the SCell 8, 10 has been described as having been swapped relative to their expected positions for the PCell 7, 9, the PSS and/or SSS may be modified in a different way to avoid the issue of erroneous detection by a legacy mobile communication device. For example, the root indices of the PSS transmitted on the secondary carrier may be modified so that different synchronisation sequences are generated. For example, rather than use any of the three possible PSS signal sequences generated using Zadoff-Chu root sequence indices u=25, 29 and 34 (as described earlier), one or more different Zadoff-Chu root sequence indices may be used. In such cases it is sufficient to modify only the PSS (although the SSS may be modified also) since a legacy mobile communication device 3 will not search for an SSS if a PSS is not first detected.

In the above embodiments, when the base station 5 identifies the radio frame locations used for the PSS/SSS transmitted by neighbouring base stations 5, this may be achieved by any suitable means. For example, if the radio frame location is explicitly linked to cell identity, then the base station 5 may identify the radio frame locations used for the PSS/SSS transmitted by neighbouring base stations 5 from the cell identity of those base stations (e.g. transmitted over the X2 interface). It will be appreciated, however, that information for use in identifying the radio frame locations used for the PSS/SSS transmitted by neighbouring base stations 5 may be acquired by other means, for example during an ANR (Automatic Neighbour Relation) procedure or the like.

It will be appreciated that whilst, in the above embodiments, synchronisation for the SCell is provided using PSS/SSS on the extension carrier which have a configurable location, in the case of intra-band carrier aggregation, where the transmission points of PCell and SCell are collocated (e.g. the PCell and SCell cover the same geographical region), the time and frequency synchronisation may be based on the PSS/SSS transmitted on the backward compatible carrier. Accordingly, in the intra band carrier aggregation case where transmission points of PCell and SCell are collocated, there may be no need to transmit the legacy synchronisation signals (PSS/SSS) in the subframes on the extension carrier. Nevertheless, in the case of inter band carrier aggregation (and intra band carrier aggregation where the transmission points of PCell and SCell are geographically separated) the provision of the PSS/SSS in the radio frames of the extension carrier is particularly beneficial.

Although extension carriers are intended, primarily, for use by release 11 (and beyond) mobile communication devices 3 it may be advantageous to provide some way by which legacy (e.g. release 10 or earlier) mobile communication devices 3 are able to use extension carriers also (i.e. in the case that a PCell 7, 9 and SCell 8, 10 are in the same frequency band and have substantially the same geographical location). One way to allow this is to transmit a certain number of release 10 backward compatible subframes on the extension carrier such that these subframes can also be used by legacy devices. However, this has the disadvantage that it requires the definition of dedicated, backwards compatible, subframes having all the control region signalling required by the legacy device thereby potentially adding to signalling overhead and potentially resulting in undesirable cell to cell interference.

In a particularly advantageous embodiment of the communication system, in the case that a PCell 7, 9 and SCell 8, 10 are in the same frequency band and have substantially the same geographical location, a number of subframes on the extension carrier are configurable as so called 'Multi-Media Broadcast over a Single Frequency Network' (MBSFN) subframes that have backwards compatibility with the legacy mobile communication devices. In this embodiment, therefore, resources of the physical downlink shared channel (PDSCH) of each MBSFN subframe on the extension carrier may be cross-carrier scheduled from the primary component carrier (which is operating within the same frequency band as the extension carrier). Configuring some of the subframes as backwards compatible MBSFN subframes in this way has the advantage that common reference signals (CRS) are not transmitted in the MBSFN subframes and hence inter-cell interference and signalling overhead may be reduced.

The idea of providing configurability for the location of synchronisation signalling on the extension carrier may advantageously be extended to other control/reference signalling. For example, for extension carriers, the transmission bandwidth of legacy common reference signalling (CRS) may be reduced to 6 resource blocks (72 subcarriers) transmitted only in the control region of each subframe on the extension carrier (e.g. restricting the location of the CRS to the first and second OFDM symbols of each subframe). In order to mitigate the risk of inter-cell interference, however, the location of the 6 resource blocks carrying the common reference signalling may, beneficially, be made configurable in a similar manner to that described for the PSS/SSS of the above embodiments.

Further, the principles of providing configurability for the location of specific control/reference/synchronisation signalling on the extension carrier may advantageously be extended to the case of demodulation reference signals (DMRS). Specifically, unprecoded legacy DMRS may also be used for maintaining the time and frequency synchronization of the SCell 8, 10. The bandwidth of unprecoded DMRS patterns may be reduced, for example, to 6 resource blocks in the control region of each subframe on the extension carrier (i.e. on the first and second OFDM symbols of the subframe). In accordance with this, a new DMRS pattern may be introduced for the control region of the subframe. Further, in order to mitigate the risk of inter-cell interference, the location of the 6 resource blocks carrying the unprecoded DMRS may be made configurable for system bandwidths equal or larger than 12 resource blocks. Moreover, the 6 resource blocks reserved for carrying the unprecoded DMRS may also be used to transmit some common control information for all mobile communication devices 3 monitoring the extension carrier.

It will be appreciated that although the communication system 1 is described in terms of base stations 5 operating as macro or pico base stations, the same principles may be applied to base stations operating as femto base stations, relay nodes providing elements of base station functionality, or other such communication nodes.

In the above embodiments, a mobile telephone based telecommunications system was described. As those skilled in the art will appreciate, the signalling techniques described in the present application can be employed in other communications system. Other communications nodes or devices may include user devices such as, for example, personal digital assistants, laptop computers, web browsers, etc. As those skilled in the art will appreciate, it is not essential that the above described relay system be used for mobile communications devices. The system can be used to extend the coverage of base stations in a network having one or more fixed computing devices as well as or instead of the mobile communicating devices.

In the embodiments described above, the base stations 5 and mobile communication devices 3 each include transceiver circuitry. Typically, this circuitry will be formed by dedicated hardware circuits. However, in some embodiments, part of the transceiver circuitry may be implemented as software run by the corresponding controller.

In the above embodiments, a number of software modules were described. As those skilled in the art will appreciate, the software modules may be provided in compiled or un-compiled form and may be supplied to the base station or the relay station as a signal over a computer network, or on a recording medium. Further, the functionality performed by part or all of this software may be performed using one or more dedicated hardware circuits.

Various other modifications will be apparent to those skilled in the art and will not be described in further detail here.

The following is a detailed description of the way in which the present inventions may be implemented in the currently proposed 3GPP standards. Whilst various features are described as being essential or necessary, this may only be the case for the proposed 3GPP standard, for example due to other requirements imposed by the standard. These statements should not, therefore, be construed as limiting the present invention in any way.

Introduction

In the last meeting, it has been agreed to introduce at least one new carrier type in Release 11 with the motivation of enhanced spectral efficiency and improved support of HetNet and energy efficiency. The conclusion and agreed working assumptions are as follows:

Conclusion

From a RAN1 perspective, the main motivations identified for introducing a new carrier type for carrier aggregation are:
  Enhanced spectral efficiency
  Improved support for HetNet
  Energy efficiency
  It is for RAN4 to determine whether there is a need for new RF bandwidths to support improved bandwidth scalability.

Working Assumptions:
  Introduce at least one new carrier type in Rel-11 (bandwidth agnostic from a RAN1 point of view), with at least reduced or eliminated legacy control signalling and/or CRS
    at least for the downlink (or for TDD, the downlink subframes on a carrier)
    associated with a backward compatible carrier
    study further:
      issues of synchronisation/tracking (including whether or not PSS/SSS are transmitted) and measurements/mobility
      resource allocation methods
      what RSs are required
  For FDD a downlink carrier of the new type may be linked with a legacy uplink carrier, and for TDD a carrier may contain downlink subframes of the new type and legacy uplink subframes.

From the above working assumptions, the main issue is how to realise the reduction or elimination of overhead caused by legacy control signalling and common reference signals (CRS) and to reduce the impact of time-frequency synchronisation as well as mobility measurements on the new carrier type (i.e. extension carrier) in Release 11.

In this contribution, we discuss some possible solutions for the issues of time-frequency synchronisations and mobility measurements on the extension carrier in Release 11.

Time Frequency Synchronisations on the Extension Carrier

Based on the agreed working assumptions from the last meeting, the extension carrier should be associated with a backward compatible carrier; therefore, we think that there are two CA (Communication Apparatus) scenarios where synchronization in time and frequency are needed for Release 11 UEs.

Intra band CA case where transmission points of Pcell and SCell are collocated.

Inter band CA case and Intra band CA where transmission points of Pcell and SCell are geographically separated.

Intra band CA case where transmission points of Pcell and SCell are collocated

In this scenario of intra band CA case where transmission points of Pcell and SCell are collocated, the time and frequency synchronisation can be derived from synchronisation signals and reference signals locating on the backward compatible carrier. This means that the carrier frequency, cell ID and system information are signaled to the UE from the primary cell. In addition, it has been proposed [2] to enable RRC signaling of downlink cyclic prefix length (normal/extended) of Scell to the UE and also the UE shall use the synchronization of the Pcell to acquire/maintain time and frequency synchronization of the Scell.

Proposal 1: Intra band CA case where transmission points of Pcell and SCell are collocated, the time and frequency synchronisation should be based on the backward compatible carrier.

Proposal 2: Intra band CA case where transmission points of Pcell and SCell are collocated, there is no need to transmit the legacy synchronisation signals (PSS/SSS) and common reference signals (CRS) in the subframes on the extension carrier.

Inter Band CA Case and Intra Band CA Case where Transmission Points of Pcell and SCell are Geographically Separated In this scenario of inter band CA case and intra band CA where transmission points of Pcell and SCell are geographically separated, there is no mechanism that provides synchronisation for the SCell for Release 11 UEs as the carrier frequency error and timing error depend on the propagation channel condition from each transmission point. Therefore, we think that some kind of known signals are needed for maintaining the time and frequency synchronization of the Scell. There are several possibilities depending on which signals are to be transmitted on the extension carrier (i.e. SCell) as follows:

Option-1: Rel-8 PSS/SSS signals transmitted on the extension carrier: Rel-8 PSS/SSS can be used for maintaining the time and frequency synchronization of the Scell. In this Option-1, the disadvantage is that the location of PSS/SSS is fixed meaning that different cells transmit on the same location causing significant interference to each other. In FDD, PSS and SSS signals are always transmitted on subframes 0 and 5 in time domain which are quite apart, and, therefore, the performance of time and frequency tracking has to be evaluated and verified for Release 11 UEs.

Option-2: Flexible locations for PSS/SSS signals: Introduce new flexible locations for PSS/SSS signals for maintaining the time and frequency synchronization of the Scell. The PSS/SSS signals can be placed in the control region of some subframes in order to avoid inter-cell interference of the synchronisation signals. For example, in FDD, SSS can be placed on the first OFDM symbol of subframes 1 and 6 in time domain and PSS can be placed on the second OFDM symbol of subframes 1 and 6 in time domain. In addition, it is possible to design multiple configurations by placing the synchronisation signals of different cells on different subframes in time domain as shown in the table below.

TABLE

Different configurations of PSS/SSS signals on different subframes

| PSS/SSS Configuration index | Location of PSS/SSS in the subframes 0-9 for FDD mode |
|---|---|
| 0 | No PSS/SSS exist |
| 1 | 0, 5 |
| 2 | 1, 6 |
| 3 | 2, 7 |
| 4 | 3, 8 |
| 5 | 4, 9 |

There are two possible alternatives for how UEs find out the location of PSS/SSS signals as follows:
  a) In advance, Pcell informs UE about the location of PSS/SSS by signalling the time and frequency location explicitly, or by signalling a pre-defined 'configuration index' from which the time and frequency location can be inferred. An example of the configuration index is shown in the table.
  b) Pcell does not need to signal the location of PSS/SSS to the UE, instead UE can work it out from Cell ID based on an equation: configuration index=(Cell ID mod 5)+1, where UE knows in advance the Cell ID and an example of the configuration index is shown in the table.

Option-3: Reduced Release 8 CRS: The transmission bandwidth of the legacy CRS is reduced to 6RBs transmitted only in the control region of each subframe on the extension carrier (i.e. keeping CRS locating in the first and second OFDM symbols of the subframe). In order to avoid inter-cell interference, it is also possible to make the location of 6RBs carrying the CRS configurable for system bandwidths equal or larger than 12PRBs.

Option-4: Un-precoded DMRS: Un-precoded Rel-10 DMRS can be used for maintaining the time and frequency synchronization of the Scell. The bandwidth of the un-precoded DMRS pattern can be further reduced, for example, to 6RBs on the control region of each subframe on the extension carrier (i.e. on the first and second OFDM symbols of the subframe). This means introducing a new DMRS pattern on the control region of the subframe as proposed in [7]. In addition, in order to avoid inter-cell interference, it is also possible to make the location of 6RBs carrying the un-precoded DMRS configurable for system bandwidths equal or larger than 12PRBs. These 6RBs carrying the un-precoded DMRS can also be used to transmit some common control information for all UEs monitoring the extension carrier.

Proposal 3: For intra band and inter band CA scenarios regardless whether transmission points of Pcell and SCell are collocated or geographically separated, the carrier frequency, cell ID, cyclic prefix length and system information of the Scell (Extension carrier) should always be signaled to the UE from the primary cell.

Proposal 4: For inter band CA case and intra band CA case where transmission points of Pcell and SCell are geographically separated, in order to maintain the time and frequency synchronization of the Extension carrier (Scell), it is proposed to select one of the options 1-4 described above or combination of some of the options.

Backward Compatibility with Rel-10 UEs on the Extension Carrier

Another issue on the Extension carrier is the backward compatibility with Rel-10 UEs. It is proposed [3] to configure backward compatible subframes on the additional carrier type and these configured subframes contain CRS. However, in order to avoid CRS overhead on the Extension carrier, it is better to configure backward compatible subframes as MBSFN subframes that are used for PDSCH transmission instead. This is only applicable to intra band CA case where transmission points of Pcell and SCell are collocated.

Proposal 5: In order to support backward compatibility with Rel-10 UEs, it should be possible to configure and cross-carrier schedule for Rel-10 UEs on MBSFN subframes carrying PDSCH data on the extension carrier in the case of intra band CA where transmission points of Pcell and SCell are collocated.

Measurements on the Extension Carrier

For Rel-11 UEs, mobility measurements of the extension carrier could be based on Pcell when the extension carrier and Pcell are intra band and collocated. This would require no support of CRS from the extension carrier for the purpose of mobility measurements. In case of inter band or intra band with geographically separated Pcell and the extension carrier, CSI-RS and or PSS/SSS signals could be used for mobility measurements. The accuracy of measurements based on CSI-RS and or PSS/SSS signals would require further study and RAN4 should be involved in these discussions.

Proposal 6: Use of CSI-RS and or PSS/SSS signals for mobility measurements should be investigated further.

Conclusion

In this contribution, we have discussed some possible solutions for the issues of time-frequency synchronisations and mobility measurements on the extension carrier in Release 11. We have the following proposals:

Proposal 1: For intra band CA case where transmission points of Pcell and SCell are collocated, the time and frequency synchronisation should be based on the backward compatible carrier.

Proposal 2: For intra band CA case where transmission points of Pcell and SCell are collocated, there is no need to transmit the legacy synchronisation signals (PSS/SSS) and common reference signals (CRS) in the subframes of the extension carrier.

Proposal 3: For intra band and inter band CA scenarios regardless whether transmission points of Pcell and SCell are collocated or geographically separated, the carrier frequency, cell ID, cyclic prefix length and system information of the Scell (Extension carrier) are always signaled to the UE from the primary cell.

Proposal 4: For inter band CA case and intra band CA case where transmission points of Pcell and SCell are geographically separated, in order to maintain the time and frequency synchronization of the Extension carrier (Scell), it is proposed to select one of the options 1-4 described in section 2.2 or combination of some of the options.

Proposal 5: In order to support backward compatibility with Rel-10 UEs, it should be possible to configure and cross-carrier schedule for Rel-10 UEs on SFN subframes carrying PDSCH data on the extension carrier in the case of intra band CA where transmission points of Pcell and SCell are collocated.

Proposal 6: Use of CSI-RS and or PSS/SSS signals for mobility measurements should be investigated further.

REFERENCES

1) RP-111115, "LTE Carrier Aggregation Enhancements", RAN#53

2) R1-111323, "Remaining details for CA based HetNet in Rel-10," Ericsson and ST-Ericsson.

3) R1-112428, "On need of additional carrier type in Rel-11 CA", NTT DOCOMO.

4) R1-112926, "On time and frequency synchronization on additional carrier types", Ericsson, ST-Ericsson 5) R1-113168, "Initial Discussions on New Carrier Types for LTE Rel-11", Renesas Mobile Europe Ltd.

6) R1-113186, "Additional Carrier Type for Rel-11", LG Electronics

7) R1-112137, "DL Control channel enhancements with carrier aggregation solutions", NEC Group.

This application is based upon and claims the benefit of priority from United Kingdom patent application No. 1119207.7, filed on Nov. 7, 2011, the disclosure of which is incorporated herein in its entirety by reference.

The invention claimed is:

1. A communication apparatus for communicating with a plurality of mobile communication devices in a cellular communication system using a plurality of radio frames, said communication apparatus comprising:

a communication control module configured to operate a communication cell on an associated component carrier;

a synchronization module configured to configure said apparatus to communicate a signal comprising at least one of a synchronization signal and a reference signal at a configured relative location within a radio frame to be transmitted in said communication cell using said component carrier, said configured relative location being a location within said radio frame relative both to a time range spanned by said radio frame and to a frequency range spanned by said radio frame; and a transceiver configured to communicate a signal at said configured relative location within said radio frame, wherein said synchronization module is operable to configure said apparatus to communicate said signal at any of a plurality of relative locations within said radio frame, wherein said communication control module is configured to operate a plurality of communication cells on respective component carriers, wherein said transceiver is operable to communicate a first signal within a first radio frame transmitted in a first of said plurality of cells using a first component carrier, said first signal being transmitted at a predetermined relative location within said radio frame relative both to a time range spanned by said first radio frame and to a frequency range spanned by said first radio frame, wherein said synchronization module is operable to configure said apparatus to communicate a second signal at a configured relative location within a second radio frame to be transmitted in a second of said plurality of cells using a second component carrier, said configured relative location being a location within said radio frame relative both to a time range spanned by said second radio frame and to a frequency range spanned by said second radio frame, wherein said transceiver is further operable to communicate a second signal at said configured relative location within said second radio frame, wherein said first and second signals are of a same type as one another, each comprising at least one of a synchronization signal and a reference signal, and wherein said synchronization module is operable to configure said apparatus to communicate said second signal at a configured relative location within said second radio frame that is different to the predetermined relative location within said first radio frame.

2. The communication apparatus according to claim 1, wherein:
   each radio frame comprises a plurality of subframes or slots spanning a range of different subframe locations or slot locations in time; and
   said synchronization module is operable to configure said apparatus to communicate said second signal, at any of a plurality of relative locations within said radio frame, which plurality of locations each comprise a different subframe location or a different slot location within said range of subframe locations or slot locations.

3. The communication apparatus according to claim 2, wherein:
   each subframe or slot comprises a plurality of symbols spanning a range of different symbol locations in time; and
   said synchronization module is operable to configure said apparatus to communicate said second signal, at a predetermined symbol location within each subframe or slot in which said signal, or said second signal is communicated, which predetermined symbol location is located within a control region of said subframe or slot.

4. The communication apparatus according to claim 2, wherein:
   each subframe or slot comprises a plurality of symbols spanning a range of different symbol locations in time; and
   said synchronization module is operable to configure said apparatus to communicate said second signal, at any of a plurality of relative locations within said radio frame, which plurality of locations each comprises a different symbol location within said range of symbol locations.

5. The communication apparatus according to claim 1, wherein:
   each radio frame comprises a plurality of subcarriers spanning a range of different subcarrier locations in frequency; and
   said synchronization module is operable to configure said apparatus to communicate said second signal, at any of a plurality of relative locations within said radio frame, which plurality of locations each comprises a different subrange of subcarrier locations within said range of subcarrier locations.

6. The communication apparatus according to claim 1, wherein:
   each radio frame comprises a plurality of resource blocks spanning a range of different resource block locations in frequency; and
   said synchronization module is operable to configure said apparatus to communicate said second signal, at any of a plurality of relative locations within said radio frame, which plurality of locations each comprises a different subrange of resource block locations within said range of resource block locations.

7. The communication apparatus according to claim 1, wherein said synchronization module is configured to identify a further relative location within a further radio frame used by a further communication apparatus to communicate a signal of the same type as said first and second signals and to configure said second signal at a configured relative location within an associated radio frame that is different to said identified further relative location within a further radio frame.

8. The communication apparatus according to claim 7, wherein said synchronization module is operable to identify said further relative location within said further radio frame by communicating with said further communication apparatus via an X2 interface.

9. The communication apparatus according to claim 7, wherein said synchronization module is operable to identify said further relative location within said further radio frame during an automatic neighbour relation (ANR) procedure.

10. The communication apparatus according to claim 1, further comprising a transmitter configured to communicate, to said mobile communication devices, information for identifying said configured relative location to said mobile communication devices.

11. The communication apparatus according to claim 10, wherein said information for identifying said configured relative location comprises a configuration index from which said configured relative location can be derived.

12. The communication apparatus according to claim 11, wherein the link between possible configuration indexes and possible configured relative locations is represented by a look-up table in a memory of the apparatus.

13. The communication apparatus according to claim 12, wherein the look-up table comprises a link between possible configuration indexes and possible configured relative locations as follows:

| Configuration Index | Subframe numbers used for associated transmission |
| --- | --- |
| 0 | None |
| 1 | 0, 5 |
| 2 | 1, 6 |
| 3 | 2, 7 |
| 4 | 3, 8 |
| 5 | 4, 9. |

14. The communication apparatus according to claim 11, wherein the link between possible configuration indexes and possible configured relative locations is represented by one or more equations in a memory of the apparatus.

15. The communication apparatus according to claim 14, wherein at least one equation represents a link between a cell identity (Cell_ID) and a configuration index as follows:

$$\text{configuration index} = (\text{Cell\_ID} \bmod 5) + 1.$$

16. The communication apparatus according to claim 10, wherein said information for identifying said configured relative location comprises an explicit indication of said configured relative location.

17. The communication apparatus according to claim 10, wherein said information for identifying said configured relative location comprises a cell identity of the cell in which said signal, or second signal, is communicated.

18. A mobile communication device for communicating with communication apparatus in a cellular communication system using a plurality of radio frames, said mobile communication device comprising:
   a communication control module configured to communicate in any of a plurality of communication cells, each being provided on a respective component carrier operated by said communication apparatus;
   a receiver that receives a first signal within a first radio frame transmitted in a first of said plurality of cells using a first component carrier, said first signal being transmitted at a predetermined relative location within said radio frame relative both to a time range spanned by said first radio frame and to a frequency range spanned by said first radio frame; and a synchronization module configured to identify a configured relative location, within a radio frame, within which location a second signal is to be transmitted, said configured relative location being a location within said radio frame relative both to a time range spanned by said radio frame and to a frequency range spanned by said radio frame, wherein said receiver is further operable to receive a second signal at said configured relative location within said second radio frame, wherein said first and second signals are of a same type as one another, each of said first and second signals comprising at least one of a synchronization signal and a reference signal, and wherein said synchronization module is operable to identify a configured relative location within said second radio frame that is different to the predetermined relative location within said first radio frame.

19. A method performed by a mobile communication device for communicating with communication apparatus in a cellular communication system using a plurality of radio frames, said mobile communication device comprising:

communicating in any of a plurality of communication cells, each being provided on a respective component carrier operated by said communication apparatus;

receiving a first signal within a first radio frame transmitted in a first of said plurality of cells using a first component carrier, said first signal being transmitted at a predetermined relative location within said radio frame relative both to a time range spanned by said first radio frame and to a frequency range spanned by said first radio frame;

identifying a configured relative location, within a radio frame, within which location a second signal is to be transmitted, said configured relative location being a location within said radio frame relative both to a time range spanned by said radio frame and to a frequency range spanned by said radio frame; and receiving a second signal at said configured relative location within said second radio frame, wherein said first and second signals are of a same type as one another, each of said first and second signals comprising at least one of a synchronization signal and a reference signal, and wherein said identifying is operable to identify a configured relative location within said second radio frame that is different from the predetermined relative location within said first radio frame.

20. A communication apparatus for communicating with a plurality of mobile communication devices in a cellular communication system using a plurality of radio frames, said communication apparatus comprising:

a communication control module configured to operate a communication cell on an associated component carrier;

a synchronization module configured to configure said apparatus to communicate a signal comprising at least one of a synchronization signal and a reference signal at a configured relative location within a radio frame to be transmitted in said communication cell using said component carrier, said configured relative location being a location within said radio frame relative both to a time range spanned by said radio frame and to a frequency range spanned by said radio frame; and a transceiver configured to communicate a signal at said configured relative location within said radio frame, wherein said synchronization module is operable to configure said apparatus to communicate said signal at any of a plurality of relative locations within said radio frame, and wherein the relative locations for the synchronization signals in the communication cell and its neighboring cell are swapped or modified within the radio frame.

* * * * *